US009721719B1

(12) United States Patent
Ikriannikov

(10) Patent No.: US 9,721,719 B1
(45) Date of Patent: Aug. 1, 2017

(54) COUPLED INDUCTORS WITH LEAKAGE PLATES, AND ASSOCIATED SYSTEMS AND METHODS

(71) Applicant: Volterra Semiconductor LLC, San Jose, CA (US)

(72) Inventor: Alexandr Ikriannikov, Castro Valley, CA (US)

(73) Assignee: Volterra Semiconductor LLC, San Jose, CA (US)

( * ) Notice: Subject to any disclaimer, the term of this patent is extended or adjusted under 35 U.S.C. 154(b) by 95 days.

(21) Appl. No.: 14/642,451

(22) Filed: Mar. 9, 2015

Related U.S. Application Data

(62) Division of application No. 13/597,969, filed on Aug. 29, 2012, now Pat. No. 8,975,995.

(51) Int. Cl.
*H01F 27/24* (2006.01)
*H01F 27/34* (2006.01)
*H01F 27/26* (2006.01)

(52) U.S. Cl.
CPC ........... *H01F 27/346* (2013.01); *H01F 27/24* (2013.01); *H01F 27/263* (2013.01)

(58) Field of Classification Search
CPC ........................................... H01F 27/00–27/30
USPC ..... 336/65, 83, 210–215, 220–223, 233–234
See application file for complete search history.

(56) References Cited

U.S. PATENT DOCUMENTS

| 2,212,543 | A | 8/1940 | Jovy |
| 2,403,393 | A | 7/1946 | Peterson |
| 3,447,068 | A | 5/1969 | Hart |
| 3,878,495 | A | 4/1975 | Thomas |
| 4,488,136 | A | 12/1984 | Hansen et al. |
| 4,531,085 | A | 7/1985 | Mesenhimer |
| 5,003,277 | A | 3/1991 | Sokai et al. |
| 5,103,201 | A | 4/1992 | Schmeller |
| 5,123,989 | A | 6/1992 | Horiishi et al. |
| 5,161,098 | A | 11/1992 | Balakrishnan |

(Continued)

FOREIGN PATENT DOCUMENTS

| EP | 0 012 629 | 6/1980 |
| EP | 1 632 964 | 3/2006 |

(Continued)

OTHER PUBLICATIONS

Chandrasekaran, S. et al., "Integrated Magnetics for Interleaved DC-Dc Boost for Fuel Cell Powered Vehicles," 35th Annual IEEE Power Electronics Specialists Conferences, 356-61 (2004).

(Continued)

*Primary Examiner* — Tuyen Nguyen
(74) *Attorney, Agent, or Firm* — Lathrop & Gage LLP

(57) ABSTRACT

A coupled inductor includes a ladder magnetic core, a first common leakage plate formed of a magnetic material, and N windings, where N is an integer greater than one. The ladder magnetic core includes first and second rails and N rungs, where each of the N rungs connects the first and second rails. Each of the N windings includes a respective first portion. Each of the N windings is wound around a respective one of the N rungs, and at least two of the N windings are wrapped at least partially around the first common leakage plate such that a first portion of the winding is disposed between an outer surface of the first rail and an outer surface of the first common leakage plate.

11 Claims, 17 Drawing Sheets

(56) References Cited

U.S. PATENT DOCUMENTS

| | | | |
|---|---|---|---|
| 5,177,460 A | 1/1993 | Dhyanchand et al. |
| 5,182,535 A | 1/1993 | Dhyanchand |
| 5,353,001 A | 10/1994 | Meinel et al. |
| 5,436,818 A | 7/1995 | Barthold |
| 5,469,334 A | 11/1995 | Balakrishnan |
| 5,568,111 A | 10/1996 | Metsler |
| 5,574,420 A | 11/1996 | Roy et al. |
| 6,018,468 A | 1/2000 | Archer et al. |
| 6,060,977 A | 5/2000 | Yamamoto et al. |
| 6,342,778 B1 | 1/2002 | Catalano et al. |
| 6,348,848 B1 | 2/2002 | Herbert |
| 6,356,179 B1 | 3/2002 | Yamada |
| 6,362,986 B1 | 3/2002 | Schultz et al. |
| 6,377,155 B1 | 4/2002 | Allen et al. |
| 6,388,896 B1 | 5/2002 | Cuk |
| 6,477,414 B1 | 11/2002 | Silvian |
| 6,714,428 B2 | 3/2004 | Huang et al. |
| 6,737,951 B1 | 5/2004 | Decristofaro et al. |
| 6,765,468 B2 | 7/2004 | Chen et al. |
| 6,774,758 B2 | 8/2004 | Gokhale et al. |
| 6,784,644 B2 | 8/2004 | Xu et al. |
| 6,867,678 B2 | 3/2005 | Yang |
| 6,903,648 B2 | 6/2005 | Baumann et al. |
| 6,922,883 B2 | 8/2005 | Gokhale et al. |
| 6,965,290 B2 | 11/2005 | Gokhale et al. |
| 6,980,077 B1 | 12/2005 | Chandrasekaran et al. |
| 7,187,263 B2 | 3/2007 | Vinciarelli |
| 7,199,695 B1 | 4/2007 | Zhou et al. |
| 7,233,132 B1 | 6/2007 | Dong et al. |
| 7,239,530 B1 | 7/2007 | Djekic et al. |
| 7,248,139 B1 | 7/2007 | Podlisk et al. |
| 7,259,648 B2 | 8/2007 | Matsutana et al. |
| 7,271,548 B2 * | 9/2007 | Hsueh ............... H05B 41/2827 315/274 |
| 7,280,025 B2 | 10/2007 | Sano |
| 7,292,128 B2 | 11/2007 | Hanley |
| 7,317,305 B1 | 1/2008 | Stratakos et al. |
| 7,352,269 B2 | 4/2008 | Li et al. |
| 7,425,883 B2 | 9/2008 | Matsutani et al. |
| 7,498,920 B2 | 3/2009 | Sullivan et al. |
| 7,525,406 B1 | 4/2009 | Cheng |
| 7,525,408 B1 | 4/2009 | Li et al. |
| 7,548,046 B1 | 6/2009 | Stratakos et al. |
| 7,567,163 B2 * | 7/2009 | Dadafshar ........... H01F 27/2847 336/178 |
| 7,649,434 B2 | 1/2010 | Xu et al. |
| 7,864,016 B1 | 1/2011 | Li et al. |
| 7,876,191 B2 * | 1/2011 | Chandrasekaran ....... H01F 3/14 336/212 |
| 7,994,888 B2 | 8/2011 | Ikriannikov |
| 2001/0043135 A1 | 11/2001 | Yamada |
| 2002/0067234 A1 | 6/2002 | Kung |
| 2004/0113741 A1 | 6/2004 | Li et al. |
| 2005/0024179 A1 | 2/2005 | Chandrasekaran et al. |
| 2006/0145804 A1 | 7/2006 | Matsutani et al. |
| 2006/0158297 A1 | 7/2006 | Sutardja |
| 2006/0197510 A1 | 9/2006 | Chandrasekaran |
| 2007/0175701 A1 | 8/2007 | Xu et al. |
| 2007/0268104 A1 | 11/2007 | Chan et al. |
| 2008/0012674 A1 | 1/2008 | Sano et al. |
| 2008/0024259 A1 | 1/2008 | Chandrasekaran et al. |
| 2008/0150666 A1 | 6/2008 | Chandrasekaran et al. |
| 2008/0169769 A1 | 7/2008 | Lee |
| 2008/0205098 A1 | 8/2008 | Xu et al. |
| 2008/0303624 A1 | 12/2008 | Yamada et al. |
| 2009/0179723 A1 | 7/2009 | Ikriannikov et al. |
| 2009/0231081 A1 | 9/2009 | Ikriannikov et al. |
| 2009/0237197 A1 | 9/2009 | Ikriannikov et al. |
| 2010/0007457 A1 | 1/2010 | Yan et al. |
| 2010/0013587 A1 | 1/2010 | Yan et al. |
| 2010/0026443 A1 | 2/2010 | Yan et al. |
| 2010/0271161 A1 | 10/2010 | Yan et al. |
| 2011/0018669 A1 | 1/2011 | Ikriannikov |
| 2011/0032068 A1 | 2/2011 | Ikriannikov |
| 2011/0035607 A1 | 2/2011 | Ikriannikov |
| 2011/0043317 A1 | 2/2011 | Ikriannikov |
| 2011/0148560 A1 | 6/2011 | Ikriannikov |
| 2011/0169476 A1 | 7/2011 | Ikriannikov |
| 2011/0260822 A1 | 10/2011 | Ikriannikov |
| 2011/0279100 A1 | 11/2011 | Ikriannikov |
| 2011/0286143 A1 | 11/2011 | Ikriannikov |
| 2011/0286144 A1 | 11/2011 | Ikriannikov |
| 2012/0056704 A1 | 3/2012 | Nagano et al. |
| 2012/0134180 A1 | 5/2012 | Watanabe et al. |

FOREIGN PATENT DOCUMENTS

| | | |
|---|---|---|
| EP | 1 950 773 | 2/2011 |
| WO | WO 2006/026674 | 3/2006 |

OTHER PUBLICATIONS

Dong et al., Evaluation of Coupled Inductor Voltage Regulators, Applied Power Electronics Conference and Exposition, pp. 831-837, Feb. 24-28, 2008.

Dong et al., The Short Winding Path Coupled Inductor Voltage Regulators, Applied Power Electronics Conference and Exposition, pp. 1446-1452, Feb. 24-28, 2008.

Dong et al., Twisted Core Coupled Inductors for Microprocessor Voltage Regulators, Power Electronics Specialists Conference, pp. 2386-2392, Jun. 17-21, 2007.

U.S. Appl. No. 13/597,969, Office Action issued Jul. 3, 2014, 6 pages.

U.S. Appl. No. 13/597,969, Response to Office Action filed Oct. 3, 2014, 13 pages.

* cited by examiner

COUPLED INDUCTORS WITH LEAKAGE PLATES, AND ASSOCIATED SYSTEMS AND METHODS

RELATED APPLICATIONS

This application is a divisional of U.S. patent application Ser. No. 13/597,969 filed Aug. 29, 2012, which is incorporated herein by reference.

BACKGROUND

It is known to electrically couple multiple switching sub-converters in parallel to increase switching power converter capacity and/or to improve switching power converter performance. One type switching power converter with multiple switching sub-converters is a "multi-phase" switching power converter, where the sub-converters switch out-of-phase with respect to each other. Such out-of-phase switching results in ripple current cancellation at the converter output filter and allows the multi-phase converter to have a better transient response than an otherwise similar single-phase converter.

As taught in U.S. Pat. No. 6,362,986 to Schultz et al., which is incorporated herein by reference, a multi-phase switching power converter's performance can be improved by magnetically coupling the energy storage inductors of two or more phases. Such magnetic coupling results in ripple current cancellation in the inductors and increases ripple switching frequency, thereby improving converter transient response, reducing input and output filtering requirements, and/or improving converter efficiency, relative to an otherwise identical converter without magnetically coupled inductors.

Two or more magnetically coupled inductors are often collectively referred to as a "coupled inductor" and have associated leakage inductance and magnetizing inductance values. Magnetizing inductance is associated with magnetic coupling between windings; thus, the larger the magnetizing inductance, the stronger the magnetic coupling between windings. Leakage inductance, on the other hand, is associated with energy storage. Thus, the larger the leakage inductance, the more energy stored in the inductor. Leakage inductance results from leakage magnetic flux, which is magnetic flux generated by current flowing through one winding of the inductor that is not coupled to the other windings of the inductor.

As taught in Schultz et al., large magnetizing inductance values are desirable to better realize the advantages of using a coupled inductor, instead of discrete inductors, in a switching power converter. Leakage inductance values, on the other hand, typically must be within a relatively small range of values. Leakage inductance must be sufficiently large to prevent excessive ripple current magnitude, but not so large that converter transient response suffers.

Coupled inductors which facilitate control of leakage inductance values have been proposed. For example, FIG. 1 shows a prior art two-winding or "two-phase" coupled inductor 100. Inductor 100 includes a magnetic core 102, which is shown as transparent. Magnetic core 102 forms a passageway 104, which is typically filled with non-magnetic material, such as air. First and second windings 106, 108 are wound through passageway 104. Current Io1 flowing through first winding 106 generates leakage magnetic flux following a path approximated by arrow 110, and current Io2 flowing through second winding 108 generates leakage magnetic flux following a path approximated by arrow 112. Leakage flux 110, 112 flows between windings 106, 108 and through passageway 104. Accordingly, leakage inductance is roughly proportional to separation 114 of windings 106, 108, and separation 114 therefore must be relatively large to achieve sufficiently large leakage inductance for typical applications.

As another example, United States Patent Application Publication Number 2009/0237197 to Ikriannikov et al., which is incorporated herein by reference, discloses, in part, coupled inductors including outer legs. The outer legs provide paths for leakage magnetic flux, and leakage inductance values can be adjusted, for example, by varying the configuration of gaps in the outer legs.

On the other hand, United States Patent Application Publication Number 2011/0032068 to Ikriannikov, which is incorporated herein by reference, discloses, in part, coupled inductors including a top magnetic element. The top magnetic element provides a path for leakage magnetic flux, and leakage inductance values can be adjusted, for example, by varying the configuration of the top magnetic element.

SUMMARY

In an embodiment, a coupled inductor includes a ladder magnetic core, a first common leakage plate formed of a magnetic material, and N windings, where N is an integer greater than one. The ladder magnetic core includes first and second rails and N rungs, where each of the N rungs connects the first and second rails. Each of the N windings includes a respective first portion. Each of the N windings is wound around a respective one of the N rungs, and at least two of the N windings are wrapped at least partially around the first common leakage plate such that a first portion of the winding is disposed between an outer surface of the first rail and an outer surface of the first common leakage plate.

In an embodiment, a coupled inductor includes a ladder magnetic core, N first leakage plates separate from each other and formed of a magnetic material, and N windings, where N is an integer greater than one. The ladder magnetic core includes first and second rails and N rungs, where each of the N rungs connects the first and second rails. Each of the N windings is wound around a respective one of the N rungs, and each of the N windings is wrapped at least partially around a respective one of the N first leakage plates such that a first portion of the winding is disposed between an outer surface of the first rail and an outer surface of the first leakage plate.

In an embodiment, a coupled inductor includes a magnetic core, first and second leakage plates separate from the magnetic core, and first and second windings wound through the magnetic core. The first and second leakage plates are formed of magnetic material and disposed on opposing sides of the magnetic core. A portion of the first winding separates the first leakage plate from the magnetic core, and a portion of the second winding separates the second leakage plate from the magnetic core.

In an embodiment, a multi-phase switching power converter includes a coupled inductor and N switching circuits, where N is an integer greater than one. The coupled inductor includes a ladder magnetic core, a first common leakage plate formed of a magnetic material, and N windings. The ladder magnetic core includes first and second rails and N rungs, where each of the N rungs connects the first and second rails. Each of the N windings includes a respective first portion. Each of the N windings is wound around a respective one of the N rungs, and at least two of the N windings are wrapped at least partially around the first common leakage plate such that a first portion of the winding is disposed between an outer surface of the first rail and an outer surface of the first common leakage plate. Each switching circuit is adapted to repeatedly switch a first end of a respective one of the N windings between at least two different voltage levels.

In an embodiment, a multi-phase switching power converter includes a coupled inductor and N switching circuits, where N is an integer greater than one. The coupled inductor includes a ladder magnetic core, N first leakage plates separate from each other and formed of a magnetic material, and N windings. The ladder magnetic core includes first and second rails and N rungs, and each of the N rungs connects the first and second rails. Each of the N windings is wound around a respective one of the N rungs, and each of the N windings is wrapped at least partially around a respective one of the N first leakage plates such that a first portion of the winding is disposed between an outer surface of the first rail and an outer surface of the first leakage plate. Each switching circuit is adapted to repeatedly switch a first end of a respective one of the N windings between at least two different voltage levels.

In an embodiment, a multi-phase switching power converter includes a coupled inductor, a first switching circuit, and a second switching circuit. The coupled inductor includes a magnetic core, first and second leakage plates separate from the magnetic core, and first and second windings wound through the magnetic core. The first and second leakage plates are formed of magnetic material and disposed on opposing sides of the magnetic core. A portion of the first winding separates the first leakage plate from the magnetic core, and a portion of the second winding separates the second leakage plate from the magnetic core. The first switching circuit is adapted to repeatedly switch a first end of the first winding between at least two different voltage levels, and the second switching circuit is adapted to repeatedly switch a first end of the second winding between at least two different voltage levels.

DETAILED DESCRIPTION OF THE EMBODIMENTS

Disclosed herein are coupled inductors including one or more leakage plates. The leakage plates advantageously allow control of leakage inductance values while promoting low core losses, high saturation current rating, and/or electromagnetic compatibility with other electrical circuitry. Additionally, in certain embodiments, the leakage plates enable the coupled inductors to have asymmetrical leakage inductance values, as discussed below.

Figure 2:
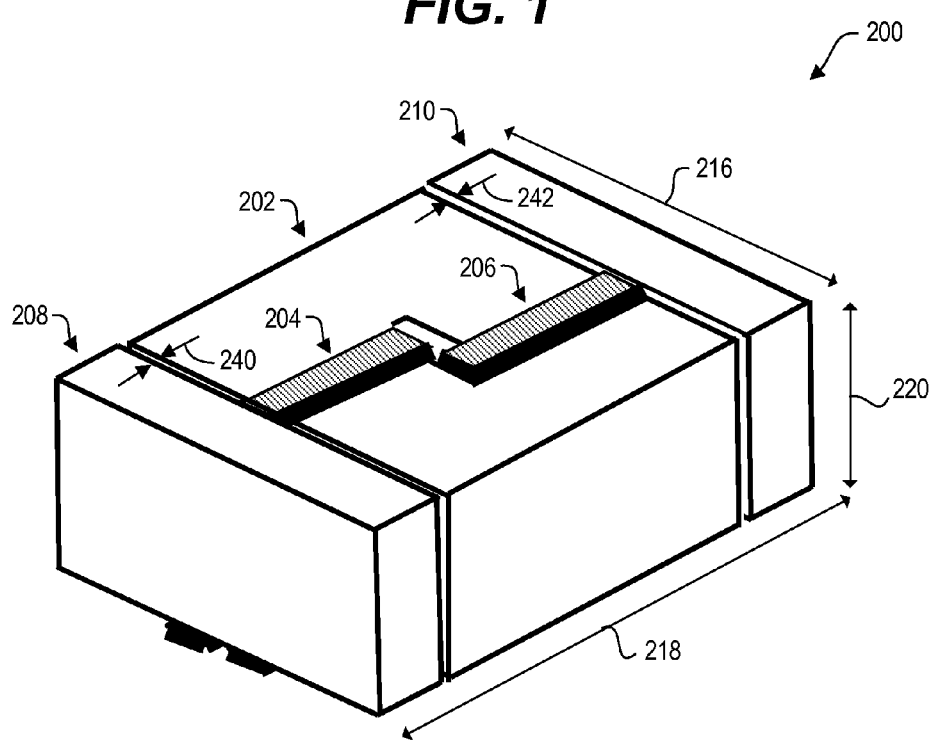
FIG. 2 shows a perspective view of a two-winding coupled inductor including two leakage plates, according to an embodiment.
Figure 3:
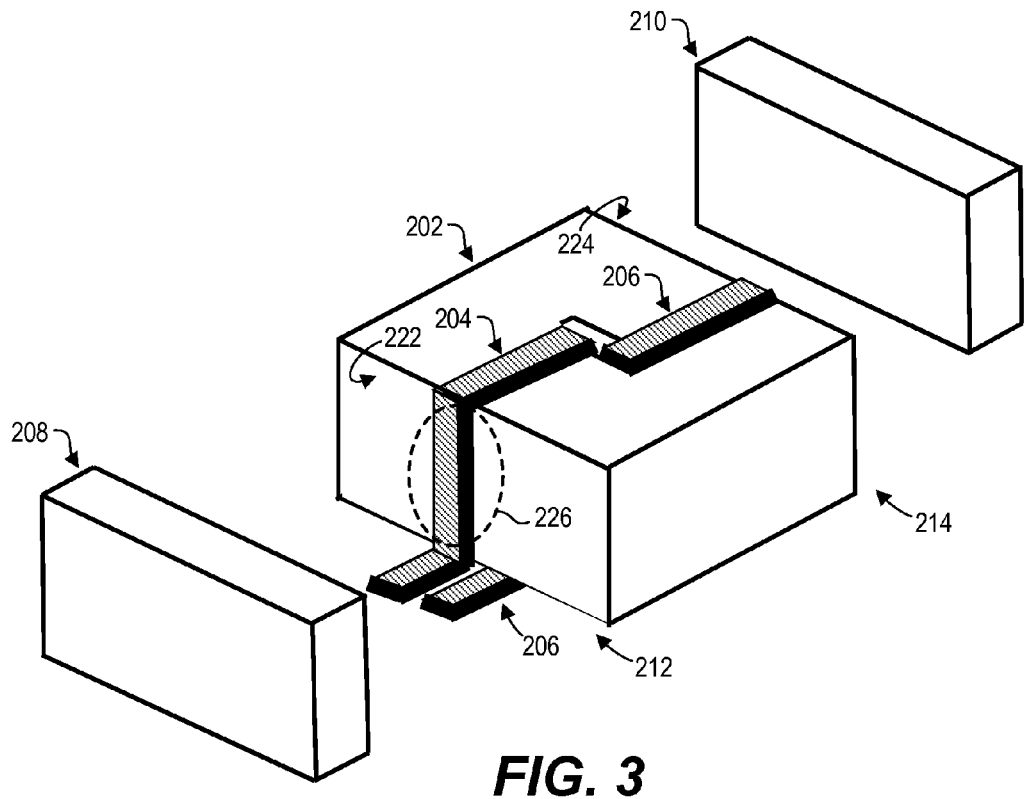
FIG. 3 shows an exploded perspective view of the FIG. 2 coupled inductor.
Figure 4:
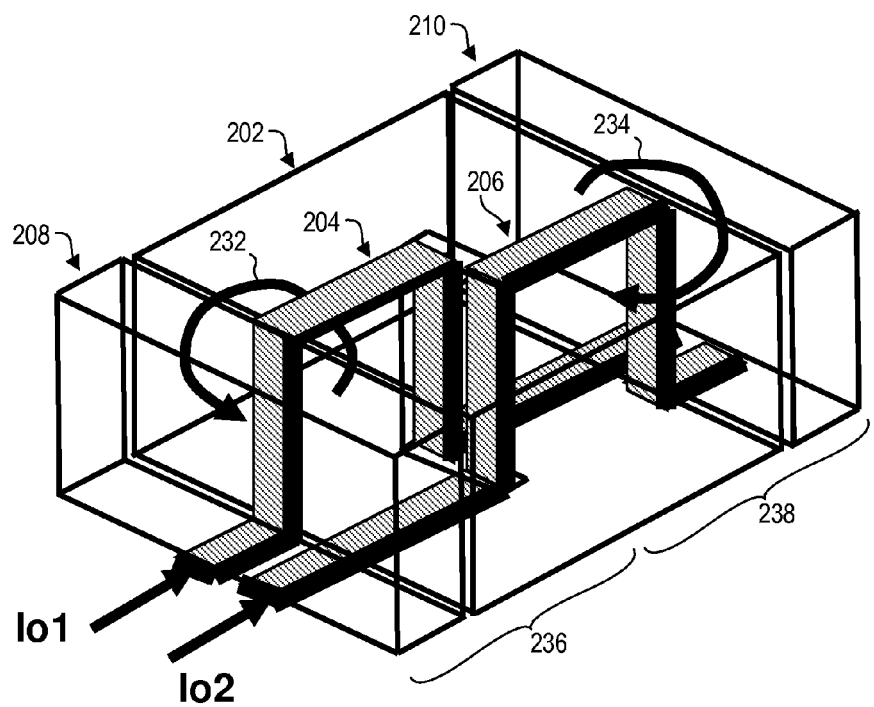
FIG. 4 shows the FIG. 2 coupled inductor with its magnetic core shown as transparent.
Figure 5:
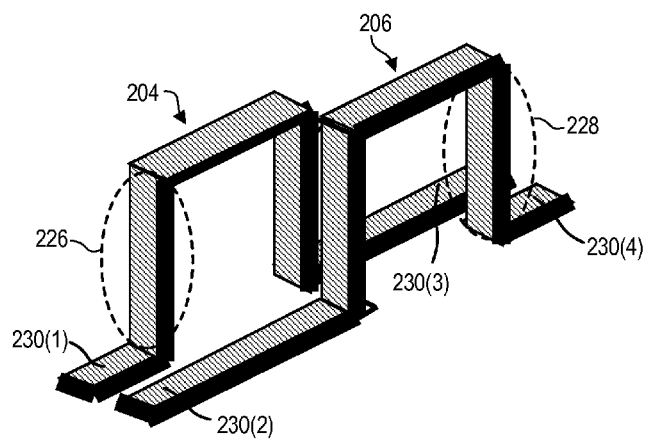
FIG. 5 shows a perspective view of the windings of the FIG. 2 coupled inductor.

FIG. 2 shows a perspective view of a two-winding or two-phase coupled inductor 200 including a magnetic core 202 and first and second windings 204, 206 wound through magnetic core 202. Inductor 202 further includes first and second leakage plates 208, 210 formed of magnetic material and disposed on opposing sides 212, 214 of magnetic core 202. FIG. 3 shows an exploded perspective view of inductor 200, where leakage plates 208, 210 are separated from the remainder of the inductor, FIG. 4 shows inductor 200 with core 202 shown as transparent, and FIG. 5 shows windings 204, 206 alone. Inductor 200 has a width 216, a depth 218, and a height 220, as shown in FIG. 2.

Magnetic core 202 has opposing first and second outer surfaces 222, 224, which in some embodiments, are planar surfaces, as shown in FIGS. 2-4. First leakage plate 208 faces first outer surface 222, and second leakage plate 210 faces second outer surface 222. A portion 226 of first winding 204 separates first leakage plate 208 from magnetic core 202 and is sandwiched between first leakage plate 208 and core first outer surface 222. A portion 228 of second winding 206 separates second leakage plate 210 from magnetic core 202 and is sandwiched between second leakage plate 210 and core second outer surface 224. Additional non-magnetic material, such as air, paper, plastic, and/or adhesive, also typically partially separates leakage plates 208, 210 from magnetic core 202. In certain embodiments, leakage plates 208, 210 are completely separated from magnetic core 202 by non-magnetic material, such as shown in FIGS. 2 and 4.

Opposing ends of each winding 204, 206 form respective solder tabs 230 adapted for surface mount soldering to a substrate, such as a printed circuit board. In this document, specific instances of an item may be referred to by use of a numeral in parentheses (e.g., solder tab 230(1)) while numerals without parentheses refer to any such item (e.g., solder tabs 230). In some alternate embodiments, one or more ends of windings 204, 206 form or are electrically coupled to an alternative connector, such as a thru-hole pin or a socket pin.

First leakage magnetic flux generated by changing current Io1 flowing through first winding 204 primarily follows a path approximated by arrow 232, and second leakage magnetic flux generated by changing current Io2 flowing through second winding 206 primarily follows a path approximated by arrow 234 (see FIG. 4). Thus, first leakage magnetic flux 232 is substantially confined to a first portion 236 of inductor 200, and second leakage magnetic flux 234 is substantially confined to a second portion 238 of inductor 200, where first and second portions 236, 238 do not overlap. Substantially confined in the context of this document means that at least seventy five percent of leakage magnetic flux generated by current flowing through first winding 204 is confined to first portion 236 of inductor 200, and at least seventy five percent of leakage magnetic flux generated by current flowing through second winding 206 is confined to second portion 238 of inductor 100.

First leakage plate 208 forms part of first leakage magnetic flux path 232, and second leakage plate 210 forms part of second leakage magnetic flux path 234. Thus, leakage inductance of first winding 204 can be adjusted by adjusting the configuration of first leakage plate 208, and leakage inductance of second winding 206 can be adjusted by adjusting the configuration of second leakage plate 210. For example, leakage inductance of first winding 204 is roughly inversely proportional to a linear separation distance 240 between first leakage plate 208 and magnetic core 202. Thus, leakage inductance of first winding 204 can be adjusted by varying separation distance 240. Similarly, leakage inductance of second winding 206 can be adjusted by varying a linear separation distance 242 between second leakage plate 210 and magnetic core 202. As another example, leakage inductance of windings 204, 206 can be adjusted by varying the dimensions and/or magnetic permeability of leakage plates 208, 210, respectively.

Coupled inductor 200 is symmetrical such that windings 204, 206 have at least substantially the same leakage inductance values. However, some alternate embodiments are asymmetrical such that windings 204, 206 have different or asymmetrical leakage inductance values. For example, in one alternate embodiment, linear separation distance 240 is different than linear separation distance 242, such that windings 204, 206 have asymmetrical leakage inductance values. As another example, in another alternate embodiment, leakage plates 208, 210 have different dimensions such that windings 204, 206 have asymmetrical leakage inductance values.

Figure 1:
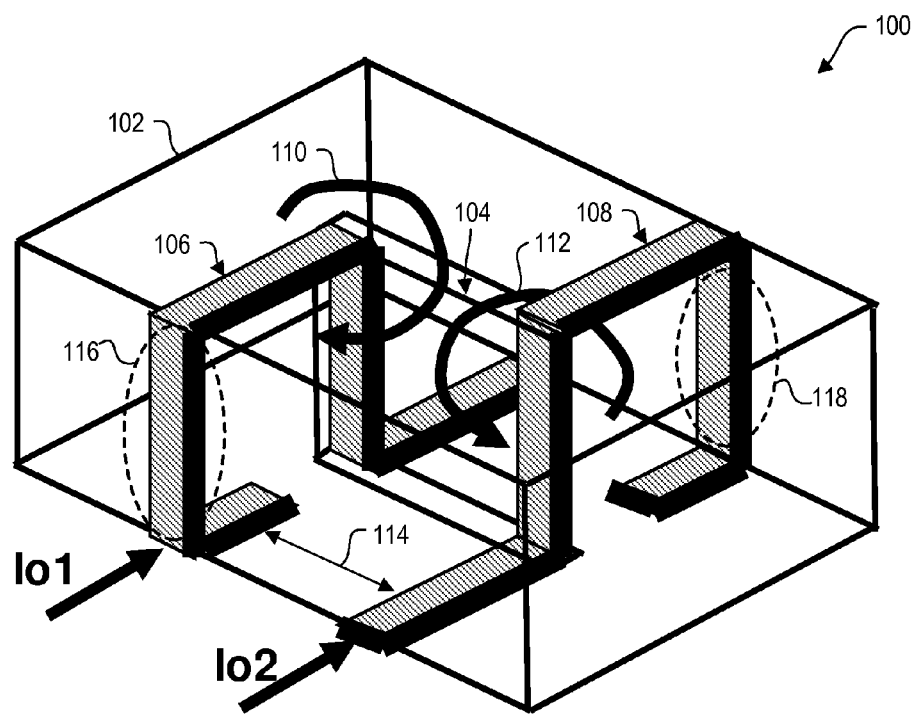
FIG. 1 shows a perspective view of a prior-art two-phase coupled inductor.

Coupled inductor 200 has a number of potential advantages over prior art two-phase coupled inductor 100 of FIG. 1. For example, as can be appreciated from leakage magnetic flux paths flux 232, 234 of inductor 200, leakage magnetic flux does not materially add, thereby promoting low magnetic flux density in magnetic core 202. Low magnetic flux density, in turns promotes large saturation current rating and low core losses. In prior art coupled inductor 100 (FIG. 1), in contrast, leakage magnetic flux adds in the center of core 102 between windings 106, 108, as shown by leakage paths 110, 112, thereby resulting in relatively large magnetic flux density in core 102 center.

As another example, coupled inductor 200 can be modified to obtain asymmetrical leakage inductance values, as discussed above. Asymmetrical leakage inductance values are less readily attainable, however, with prior art coupled inductor 100 (FIG. 1). Additionally, the fact that winding portions 226, 228 of inductor 200 are sandwiched between magnetic elements helps shield other electrical circuitry from these winding portions, thereby promoting electromagnetic compatibility between inductor 200 and the other circuitry. In inductor 100, in contrast, outer winding portions 116, 118 are not shielded by magnetic elements, thereby potentially negatively impacting electromagnetic compatibility between inductor 100 and other electrical circuitry.

As yet another example, winding separation 114 of prior art inductor 100 typically must be relatively large to obtain sufficiently large leakage inductance values. No such winding separation is required in coupled inductor 200, however, to obtain leakage inductance. Thus, the configuration of inductor 200 allows for certain embodiments to have a relatively small width 216.

The configuration of windings 204, 206 may be varied without departing from the scope hereof. For example, windings 204, 206 are shown as being foil windings to help minimize winding conduction losses at high frequency operating conditions. However, in some alternate embodiments, windings 204, 206 have a round cross-section to minimize winding cost. Additionally, although magnetic core 202 and leakage plates 208, 210 are shown as having a rectangular shape, the shape of one or more of these elements could be modified without departing from the scope hereof. For example, in certain alternate embodiments, leakage plates 208, 210 have rounded edges.

Figure 6:
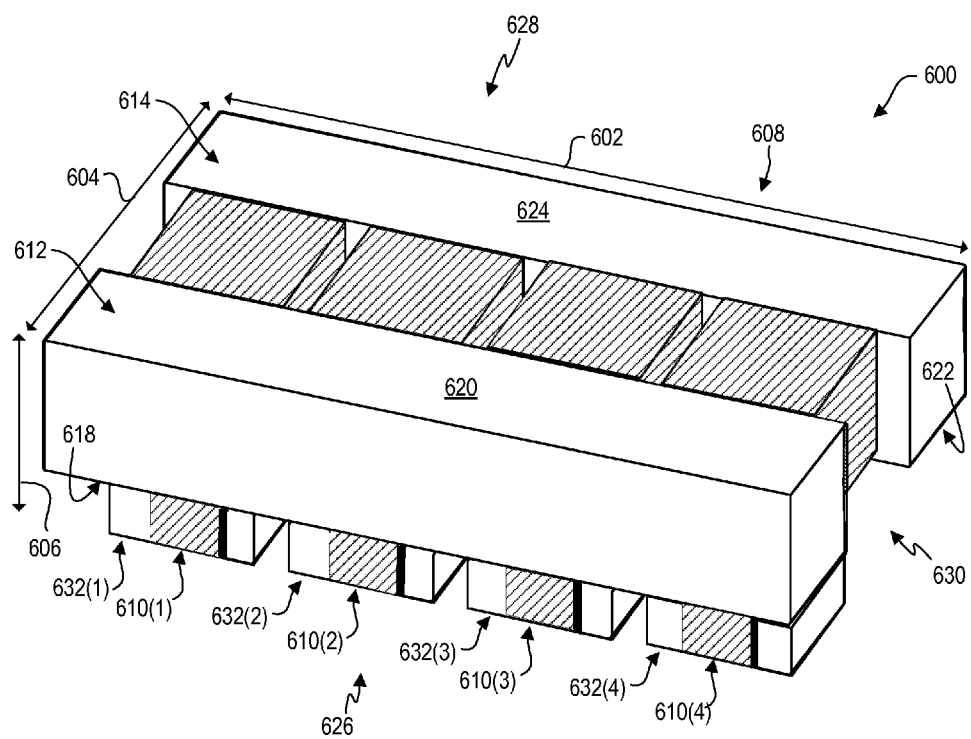
FIG. 6 shows a perspective view of a coupled inductor which can be adapted to have N windings or phases, where N is an integer greater than one, according to an embodiment.

FIG. 6 shows a perspective view of a coupled inductor 600 which can be adapted to have N windings or phases, where N is an integer greater than one. In the example illustrated herein, N is equal to four, such that coupled inductor 600 has four windings. Coupled inductor 600 has a width 602, depth 604, and height 606, as shown in FIG. 6.

Coupled inductor 600 includes a magnetic core 608 and N windings 610. Magnetic core 608 is a ladder magnetic core including opposing first and second rails 612, 614 and N rungs 616. Each winding 610 is wound around a respective rung 616. Each rung 616 is disposed between rails 612, 614, and each rung 616 connects rails 612, 614. In certain embodiments, first and second rails 612, 614 are substantially parallel to each other, and the N rungs 616 are also substantially parallel each other. First rail 612 has opposing outer surfaces 618, 620, and second rail 614 has opposing outer surfaces 622, 624.

Figure 7:
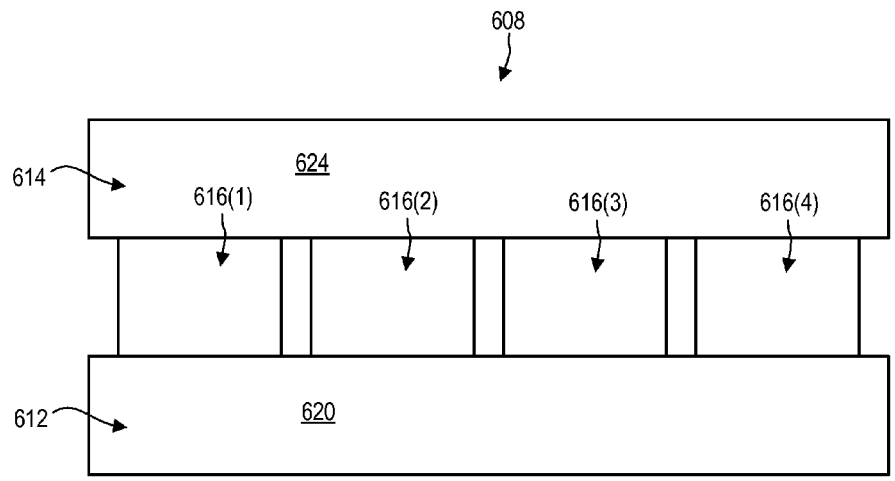
FIG. 7 shows a top plan view of the magnetic core of the FIG. 6 inductor.
Figure 8:
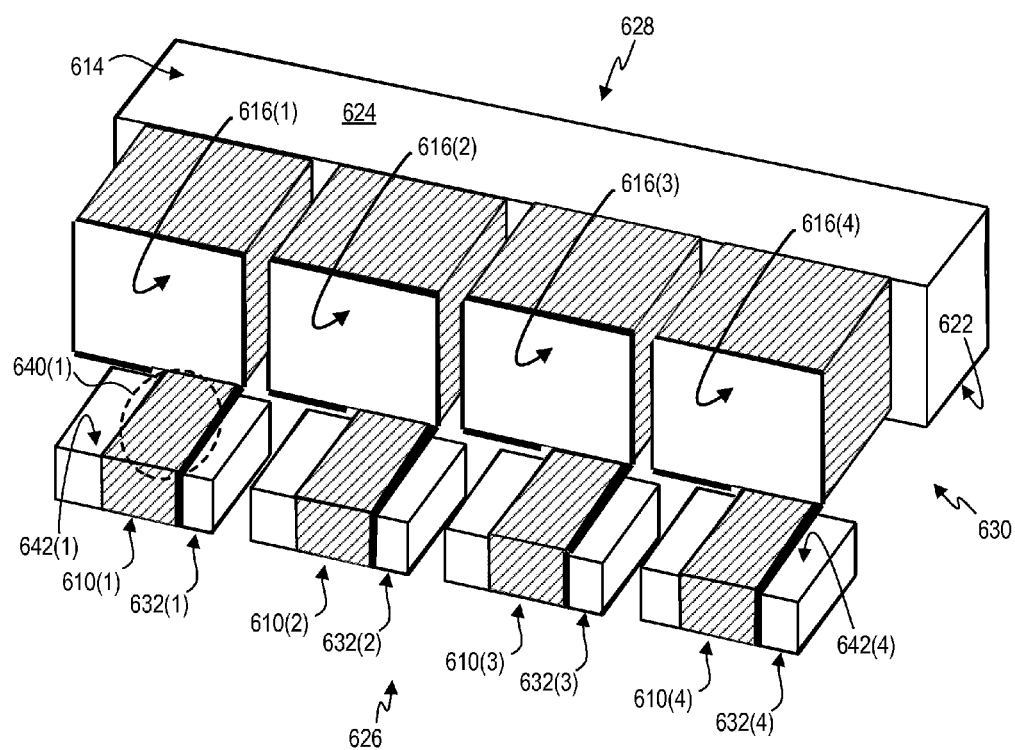
FIG. 8 shows a perspective view of the FIG. 6 inductor with a first rail of the magnetic core removed.
Figure 9:
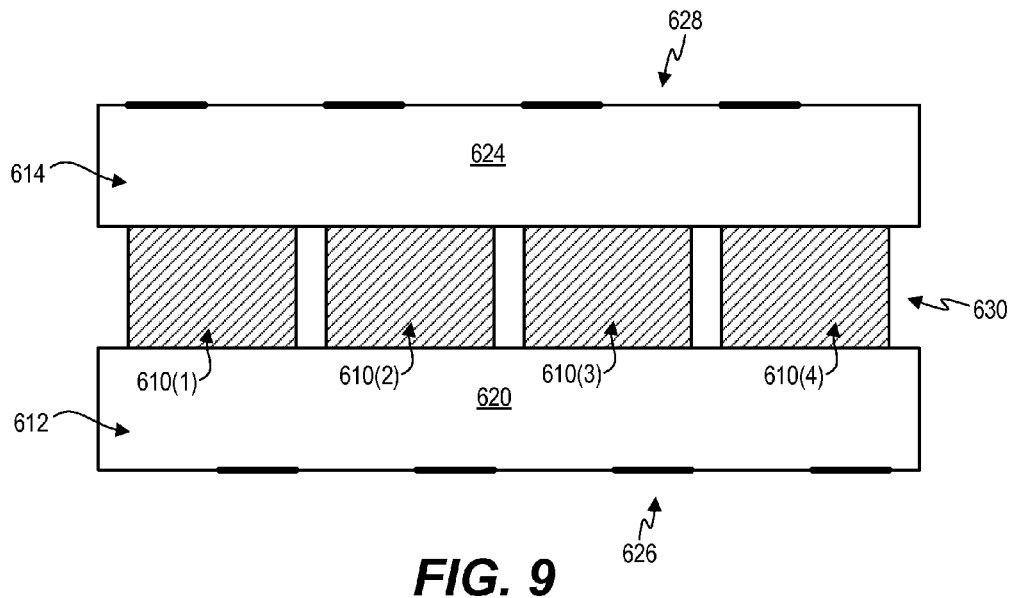
FIG. 9 shows a top plan view of the FIG. 6 inductor.
Figure 10:
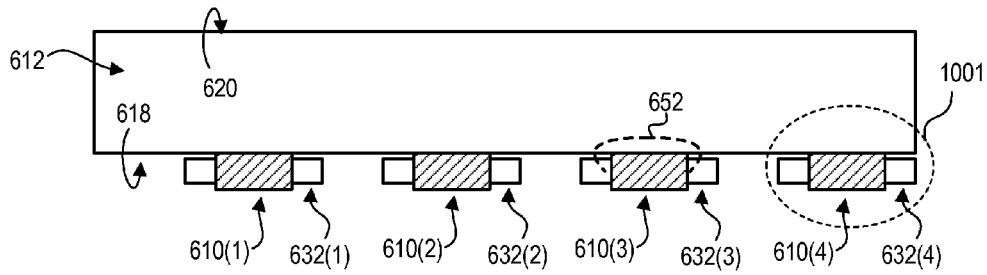
FIG. 10 shows a first side of the FIG. 6 inductor.
Figure 11:
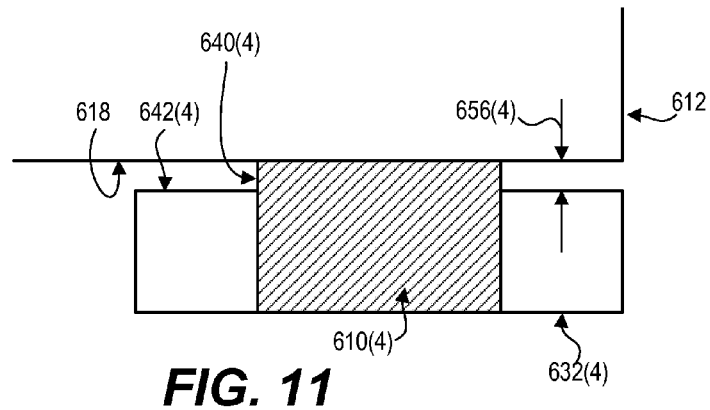
FIG. 11 shows a close-up view of a portion of FIG. 10.
Figure 12:
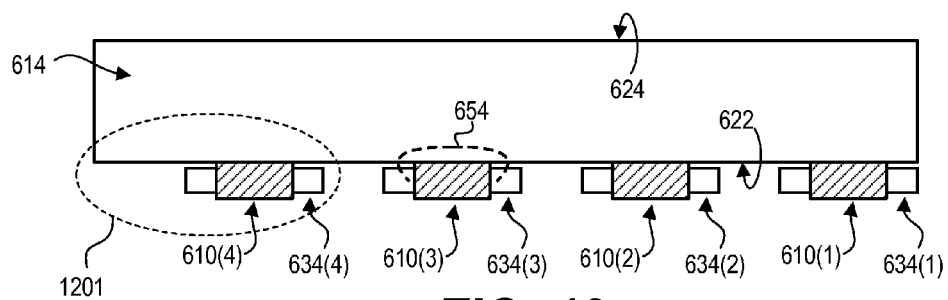
FIG. 12 shows a second side of the FIG. 6 inductor.
Figure 13:
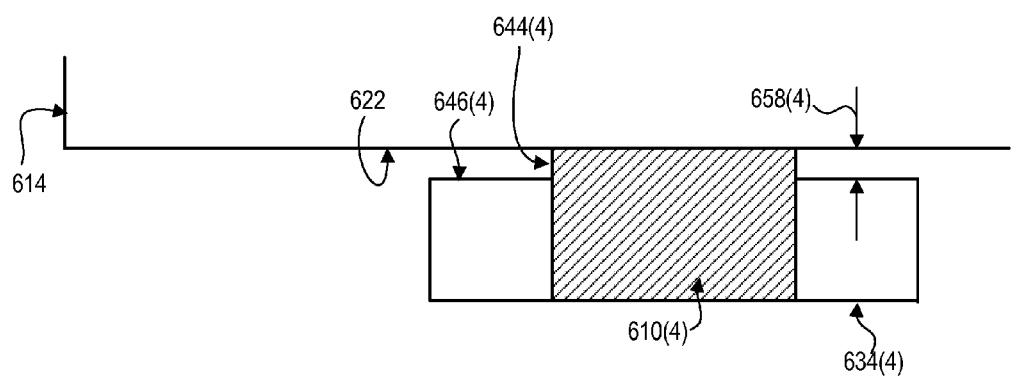
FIG. 13 shows a close-up view of a portion of FIG. 12.
Figure 14:
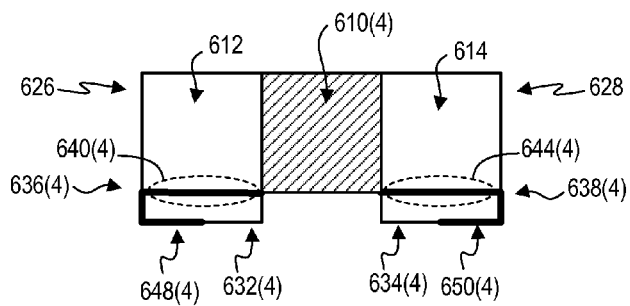
FIG. 14 shows an end of the FIG. 6 inductor.
Figure 15:
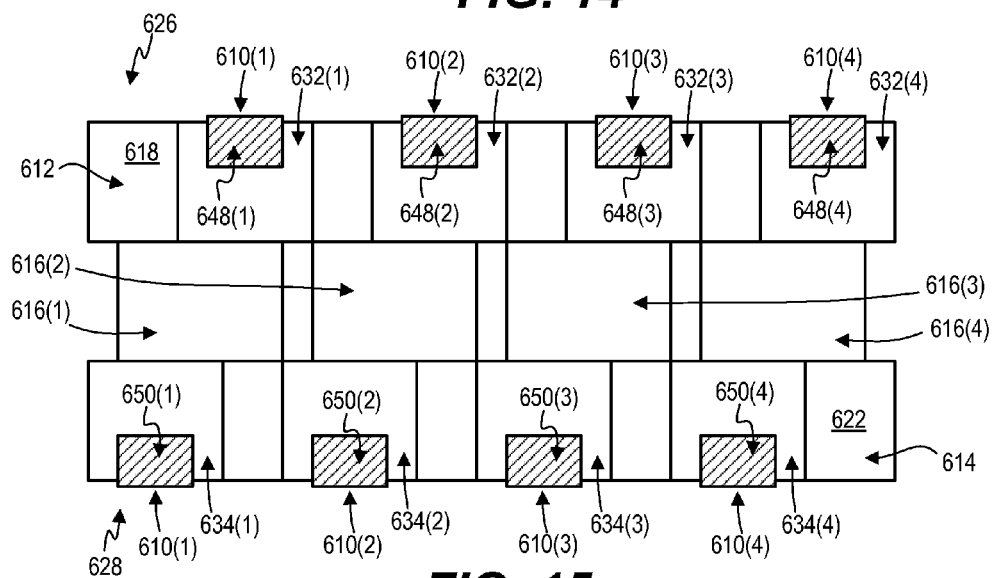
FIG. 15 shows a bottom plan view of the FIG. 6 inductor.

FIG. 7 shows a top plan view of inductor 600 without windings 610 to better show magnetic core 608. FIG. 8 shows a perspective view of inductor 600 with first rail 612 removed, and FIG. 9 shows a top plan view of inductor 600. FIG. 10 shows a first side 626 of inductor 600, and FIG. 11 shows a close-up view of portion 1001 of FIG. 10. FIG. 12 shows a second side 628 of inductor 600, and FIG. 13 shows a close-up view of portion 1201 of FIG. 12. FIG. 14 shows an end 630 of inductor 600, and FIG. 15 shows a bottom plan view of inductor 600.

Figure 16:
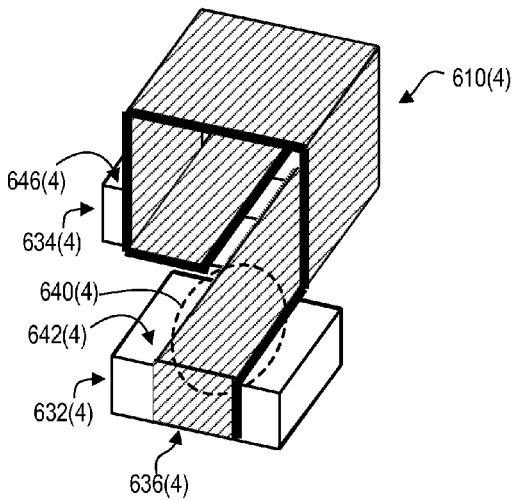
FIG. 16 shows a perspective view of a winding and two leakage plates of the FIG. 6 inductor without the remainder of the inductor.
Figure 17:
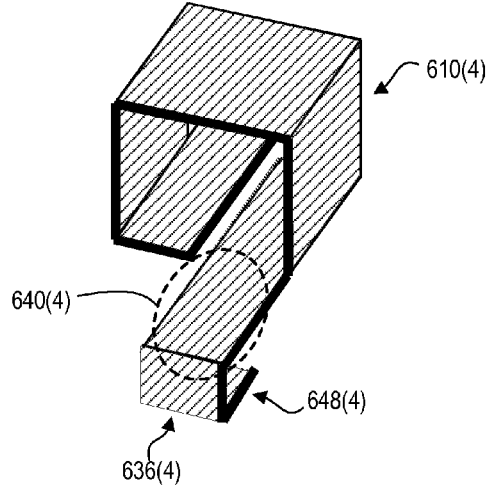
FIG. 17 shows a perspective view of a winding of the FIG. 6 inductor without the remainder of the inductor.

Coupled inductor 600 further includes N separate first leakage plates 632 formed of magnetic material and N separate second leakage plates 634 formed of magnetic material. Each winding 610 has opposing first and second ends 636, 638 (see FIG. 14). Each first end 636 is wrapped at least partially around a respective first leakage plate 632, and each second end 638 is wrapped at least partially around a respective second leakage plate 634. FIG. 16 shows a perspective view of winding 610(4) and leakage plates 632(4), 634(4) separated from the remainder of inductor 600, and FIG. 17 shows a perspective view of winding 610(4) separated from the remainder of inductor 600.

First leakage plates 632 are disposed along outer surface 618 of first rail 612, and second leakage plates 634 are disposed along an outer surface 622 of second rail 614. A first portion 640 of each winding 610 is disposed on first rail outer surface 618, and the winding's respective first leakage plate 632 is disposed on the winding's first portion 640 (see FIGS. 11, 14, and 16). A second portion 644 of each winding 610 is disposed on second rail outer surface 622, and the winding's respective second leakage plate 634 is disposed on the winding's second portion 644 (see FIGS. 13 and 14). Thus, each first portion 640 is disposed between outer surface 618 of first rail 612 and outer surface 642 of its respective first leakage plate 632, and each second portion 644 is disposed between outer surface 622 of second rail 614 and an outer surface 646 of its respective second leakage plate 634. Accordingly, first and second rails 612, 614 and first and second leakage plates 632, 634 help shield other components from first and second winding portions 640, 644, thereby promoting electromagnetic compatibility between inductor 600 and other electronic components. First and second leakage plates 632, 634 are typically also separated from rails 612, 614 by other non-magnetic material, such as air, plastic, paper, and/or adhesive. However, in certain embodiments, some magnetic material is present between leakage plates 632, 634 and rails 612, 614, such as to regulate spacing between the leakage plates and the rails. Additionally, in some embodiments, winding portions 640, 644 are separated from some or all rail and leakage plate outer surfaces 618, 622, 642, 646 by insulating material.

Each winding first end 636 forms a solder tab 648 on its respective first leakage plate 632, and each winding second end 638 forms a solder tab 650 on its respective second leakage plate 634. Solder tabs 648, 650 are adapted for surface mount soldering to a substrate, such as a printed circuit board. In some alternate embodiments, one of more solder tabs 648, 650 are replaced with an alternative connector, such as a thru-hole pin or a socket pin.

Each leakage plate 632, 634 forms part of a leakage magnetic flux path for its respective winding. For example, FIG. 10 illustrates a first leakage magnetic flux path 652 for winding 610(3) partially formed by first leakage plate 632(3), and FIG. 12 illustrates a second leakage magnetic flux path 654 for winding 610(3) partially formed by second leakage plate 634(3). Thus, leakage magnetic flux paths are largely independent for each winding 610, thereby promoting low magnetic flux density in magnetic core 608. As discussed above, low magnetic flux density promotes a high saturation current rating and low core losses.

The fact that leakage magnetic flux paths for each winding 610 are largely independent also facilitates individual control of leakage inductance for each winding 610. For example, leakage inductance for each winding 610 can be individually adjusted by varying a first linear separation distance 656 between its respective first leakage plate 632 and first rail 612. Similarly, leakage magnetic inductance for each winding 610 can also be individually adjusted by varying a second linear separation distance 658 between its respective second leakage plate 634 and second rail 614. For example, leakage inductance of winding 610(4) can be increased by decreasing first separation distance 656(4) and/or 658(4) (see FIGS. 11 and 13). Furthermore, leakage inductance of each winding 610 can be individually adjusted by varying the size and/or magnetic permeability of its respective first and/or second leakage plate 632, 634. For example, leakage inductance of winding 610(4) can be decreased by decreasing the size of first leakage plate 632(4) and/or second leakage plate 634(4).

Coupled inductor 600 is shown as being symmetrical, such that each winding 610 has substantially the same leakage inductance value. However, the fact that leakage inductance of each winding 610 can be individually adjusted allows for leakage inductance values to vary among windings 610, or in other words, for inductor 600 to have asymmetrical leakage inductance values. Thus, in some alternate embodiments, one or more first linear separation distance 656, second linear separation distance 658, leakage plate size, and/or leakage plate magnetic permeability vary among windings 610, such that inductor 600 has asymmetrical leakage inductance values.

In some alternate embodiments, second leakage plates 634 are omitted to reduce inductor cost, with the possible tradeoff of increased core losses and less flexibility in obtaining desired leakage inductance values. In these embodiments, the second leakage plates are optionally replaced with standoffs to position second solder tabs 650 at the same height as first solder tabs 648, or second rail 614 is optionally made taller (longer in the height 606 direction) than first rail 612 such that solder tabs 650 are positioned at the same height as first solder tabs 648.

The configuration of windings 610 may be varied without departing from the scope hereof. For example, windings 610 are shown as being foil windings to help minimize winding conduction losses at high frequency operating conditions. However, in some alternate embodiments, windings 610 have a round cross-section to minimize winding cost. Additionally, although rails 612, 614, rungs 616, and leakage plates 632, 634 are shown as having a rectangular shape, the shape of one or more of these elements could be modified without departing from the scope hereof. For example, in certain alternate embodiments, rungs 616 have rounded edges.

Figure 18:
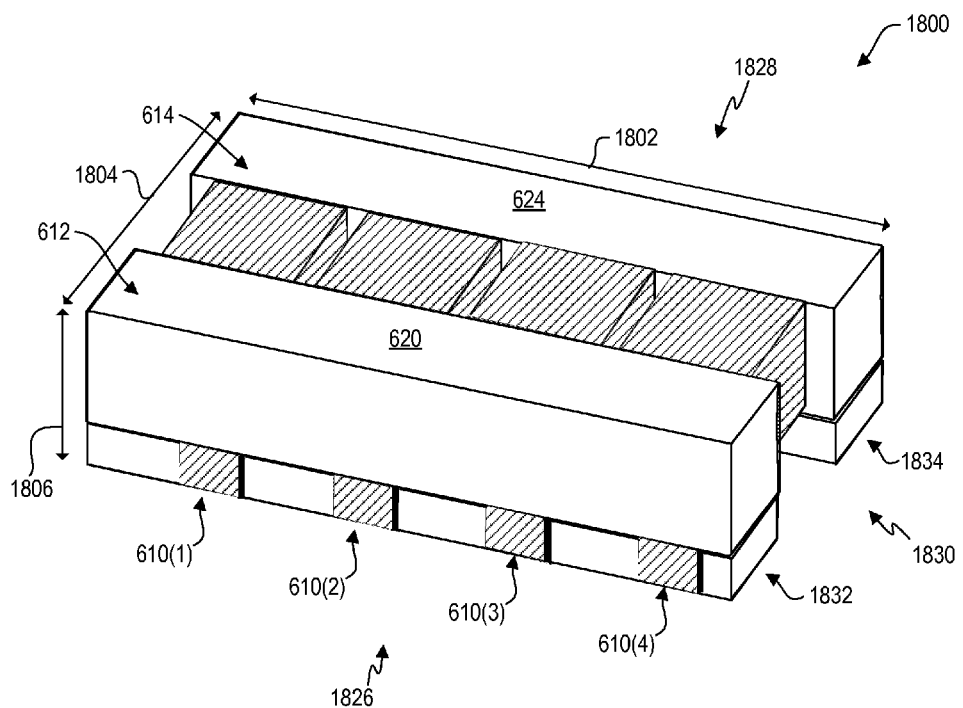
FIG. 18 shows a perspective view of a coupled inductor which is similar to the inductor of FIG. 6, but with a different leakage plate configuration, according to an embodiment.
Figure 19:
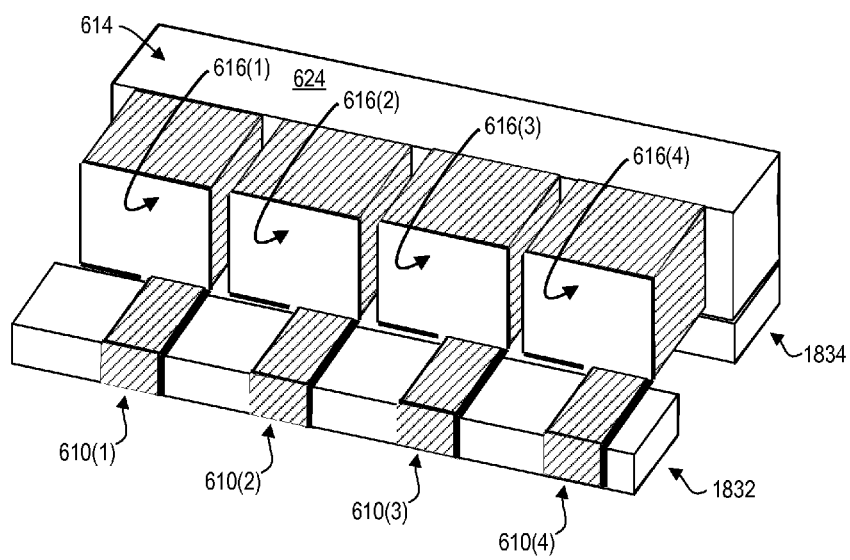
FIG. 19 shows a perspective view of the FIG. 18 inductor with a first rail of the magnetic core removed.
Figure 20:
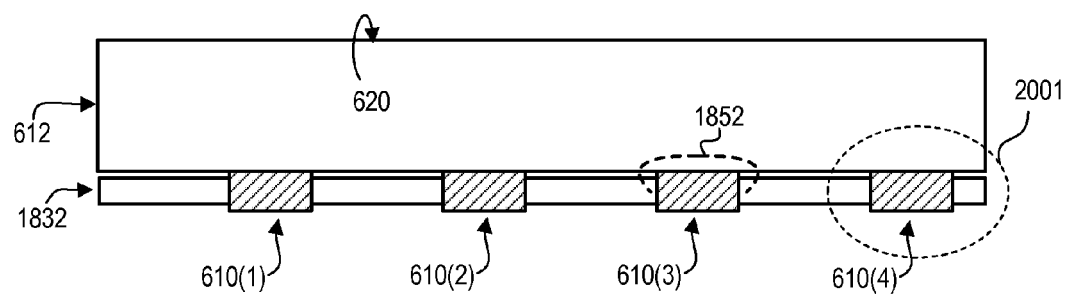
FIG. 20 shows a first side of the FIG. 18 inductor.
Figure 21:
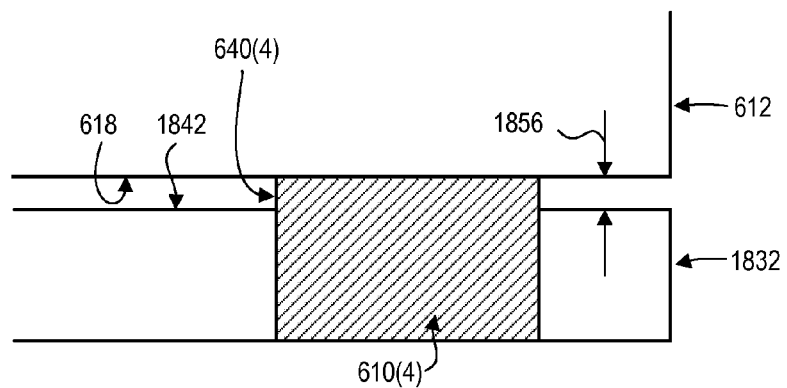
FIG. 21 shows a close-up view of a portion of FIG. 20.
Figure 22:
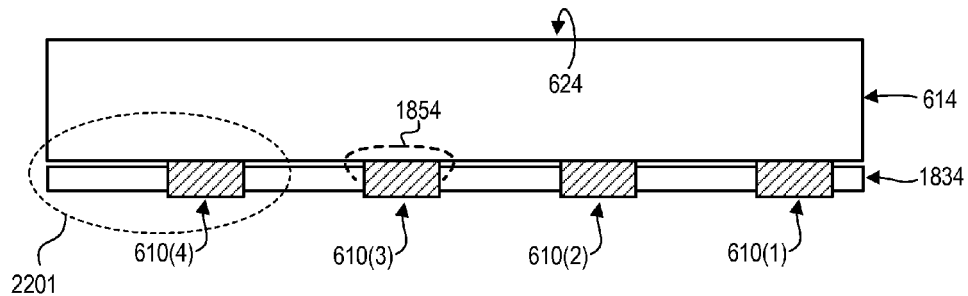
FIG. 22 shows a second side of the FIG. 18 inductor.
Figure 23:
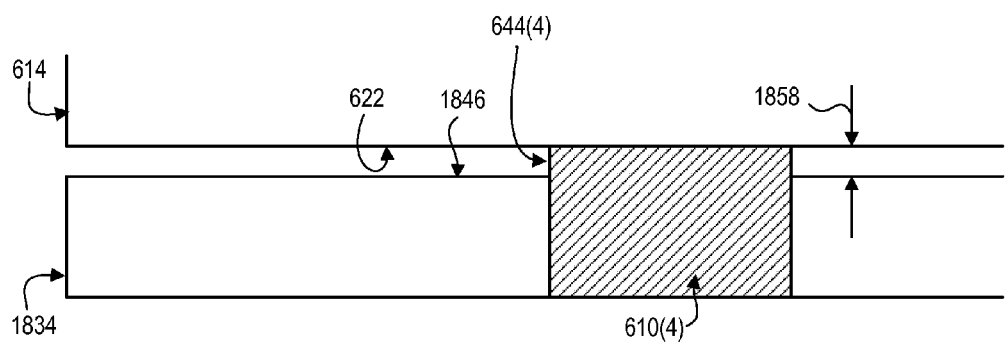
FIG. 23 shows a close-up view of a portion of FIG. 23.
Figure 24:
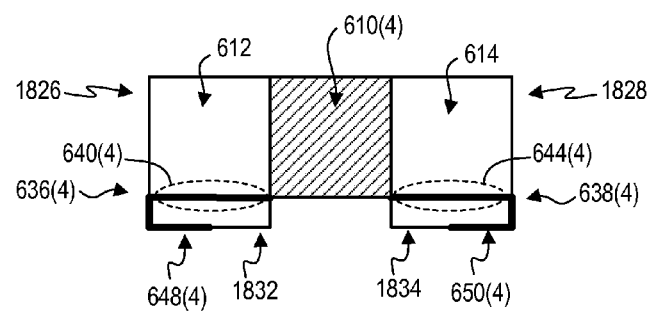
FIG. 24 shows an end of the FIG. 18 inductor.

Although having a first and second leakage plate 632, 634 for each winding 610 advantageously facilitates individual control of winding leakage inductance values, this configuration results in a relatively large number of leakage plates, which may make inductor assembly complex. FIG. 18 shows a perspective view of a coupled inductor 1800, which is similar to inductor 600 (FIG. 6), but includes separate first and second common leakage plates 1832, 1834, in place of N first and second leakage plates 632, 634. Coupled inductor 1800 may be simpler to manufacture than coupled inductor 600, although coupled inductor 1800 offer less flexibility in configuring leakage inductance values than inductor 600. Coupled inductor 1800 has a width 1802, a depth 1804, and a height 1806. FIG. 19 shows a perspective view of inductor 1800 with first rail 612 removed. FIG. 20 shows a first side 1826 of inductor 1800, and FIG. 21 shows a close-up view of portion 2001 of FIG. 20. FIG. 22 shows a second side 1828 of inductor 1800, and FIG. 23 shows a close-up view of portion 2201 of FIG. 22. FIG. 24 shows an end 1830 of inductor 1800.

Each of first and second common leakage plates 1832, 1834 are formed of magnetic material. Each winding first end 636 is wrapped at least partially around first common leakage plate 1832, and each winding second end 638 is wrapped at least partially around second common leakage plate 1834. First common leakage plate 1832 is disposed along an outer surface 618 of first rail 612, and second common leakage plate 1834 is disposed along an outer surface 622 of second rail 614. Winding first portions 640 are disposed on first rail outer surface 618, and first common leakage plate 1832 is disposed on first portions 640 (see FIGS. 21 and 24). Winding second portions 644 are disposed on second rail outer surface 622, and second common leakage plate 1834 is disposed on second portions 644 (see FIGS. 23 and 24). Thus, first portion 640 of each winding 610 is disposed between outer surface 618 of first rail 612 and outer surface 1842 of first common leakage plate 1832, and second portion 644 of each winding 610 is disposed between outer surface 622 of second rail 614 and outer surface 1846 of common leakage plate 1834. Accordingly, first and second rails 612, 614 and first and second common leakage plates 1832, 1834 shield winding portions 640, 644 from other electrical circuitry. First and second common leakage plates 1832, 1834 are typically also separated from rails 612, 614 by other non-magnetic material, such as air, plastic, paper, and/or adhesive. However, in certain embodiments, some magnetic material is present between common leakage plates 1832, 1834 and rails 612, 614, such as to regulate spacing between the leakage plates and the rails. Additionally, in some embodiments, winding portions 640, 644 are separated from some or all rail and common leakage plate outer surfaces 618, 622, 1842, 1846 by insulating material.

Each common leakage plate 1832, 1834 forms part of a leakage magnetic flux path for windings 610. For example, FIG. 20 illustrates a first leakage magnetic flux path 1852 for winding 610(3) partially formed by first common leakage plate 1832, and FIG. 22 illustrates a second leakage magnetic flux path 1854 for winding 610(3) partially formed by second common leakage plate 1834. Thus, while leakage magnetic flux paths are substantially separate for each winding 610, there is some interaction in leakage magnetic flux between windings 610 due to windings 610 sharing common leakage plates 1832, 1834 Thus, it may be easier to individually control leakage inductance values of windings 610 in coupled inductor 600 (FIG. 6) than in coupled inductor 1800. Leakage inductance values of windings 610 can be adjusted, for example, by varying linear separation distances 1856, 1858 between first and second common leakage plates 1832, 1834 and first and second rails 612, 614.

Common leakage plates 1832, 1834 are shown as having a rectangular shape and extending along the entirety of inductor width 1802. However, the shape of one or more leakage plates 1832, 1834 could be varied without departing from the scope hereof. For example, in some alternate embodiments, common leakage plates 1832, 1834 have rounded corners. Additionally, in some alternate embodiments, common leakage plates 1832, 1834 do not extend along entire inductor width 1802. Furthermore, although linear separation distances 1856, 1858 are shown as being constant along inductor width 1802, in certain alternate embodiments, one or more of separation distances 1856, 1858 varies along width 1802 to achieve asymmetrical leakage inductance values.

Figure 25:
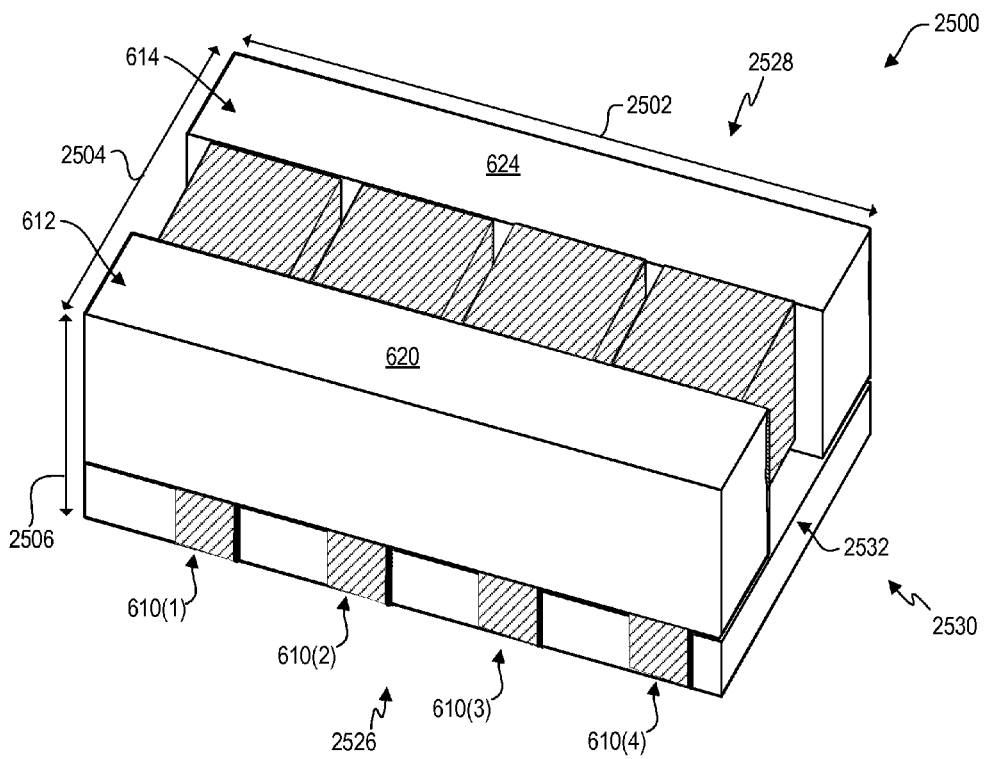
FIG. 25 shows a perspective view of a coupled inductor which is similar to the inductor of FIG. 18, but with a different leakage plate configuration, according to an embodiment.

FIG. 25 shows a perspective view of a coupled inductor 2500, which is similar to inductor 1800 (FIG. 18), but includes a single common leakage plate 2532 in place of first and second common leakage plates 1832, 1834. Such consolidation of leakage plates in inductor 2500 may result in inductor 2500 being cheaper and/or less complex to manufacture than inductor 1800, and the configuration of inductor 2500 also promotes large leakage inductance values. However, as discussed below, use of single common leakage plate 2532 may reduce flexibility in configuring leakage inductance values, relative to inductor 1800 with both first and second common leakage plates 1832, 1834.

Figure 26:
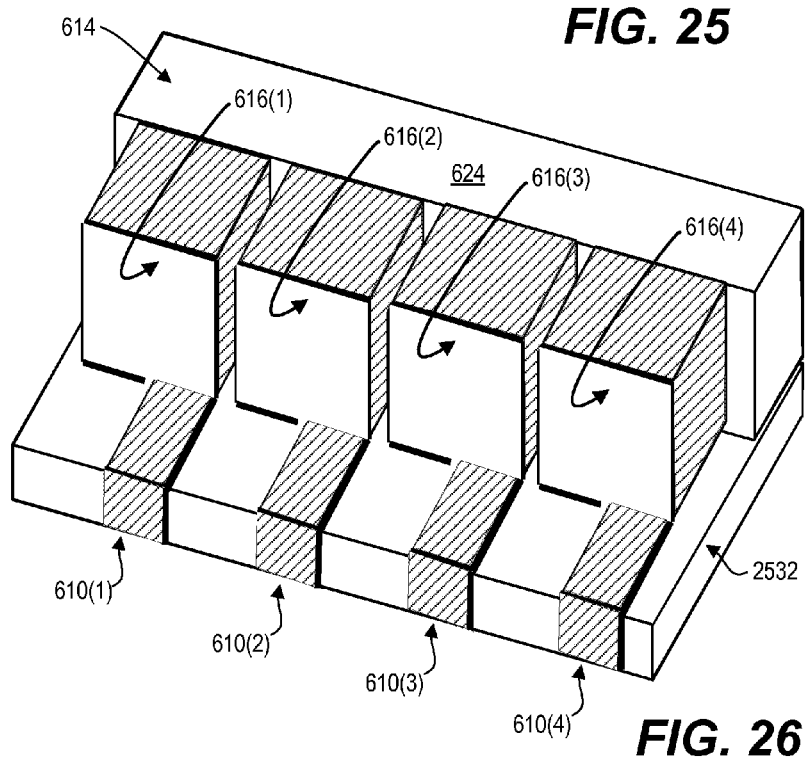
FIG. 26 shows a perspective view of the FIG. 25 inductor with a first rail of the magnetic core removed.
Figure 27:
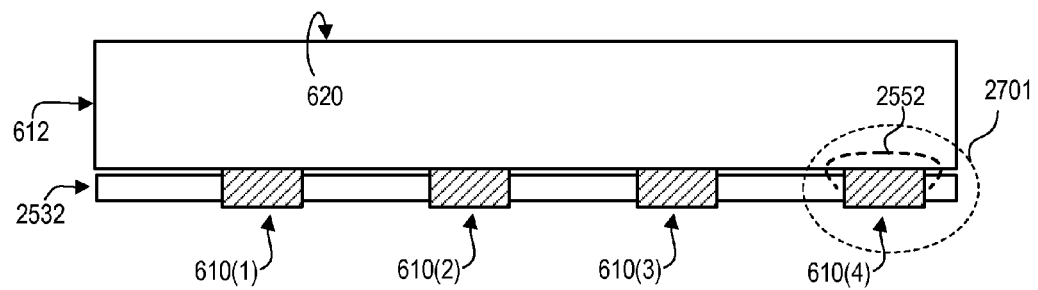
FIG. 27 shows a first side of the FIG. 25 inductor.
Figure 28:
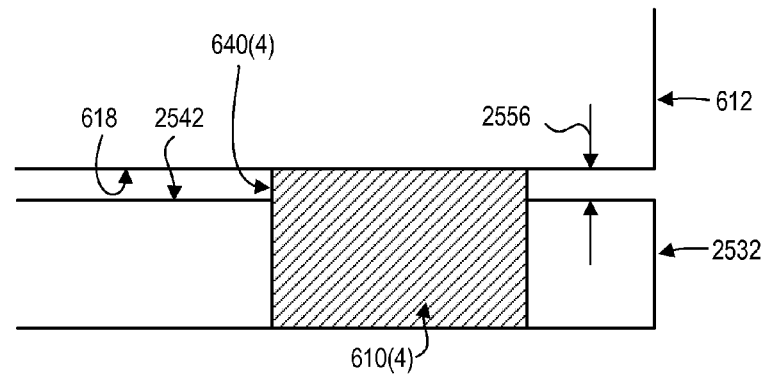
FIG. 28 shows a close-up view of a portion of FIG. 27.
Figure 29:
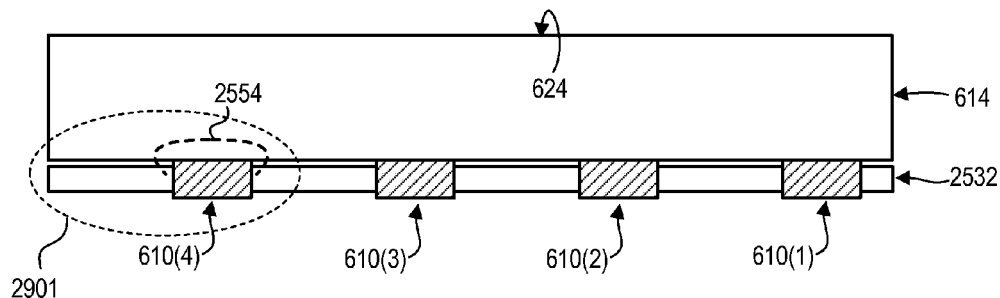
FIG. 29 shows a second side of the FIG. 25 inductor.
Figure 30:
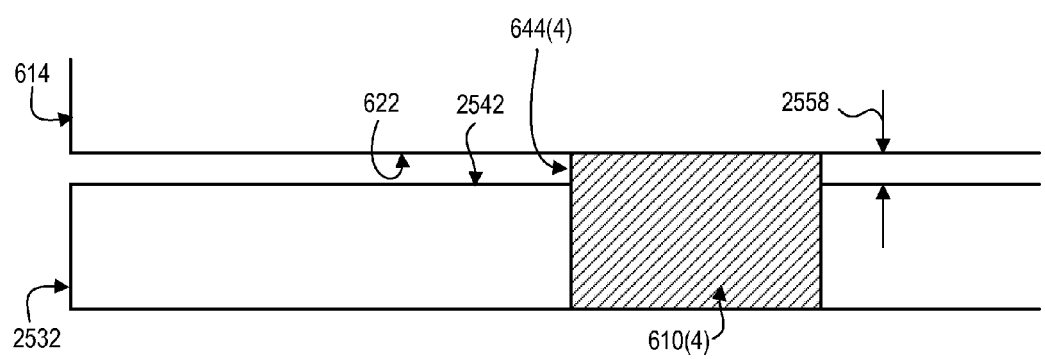
FIG. 30 shows a close-up view of a portion of FIG. 29.
Figure 31:
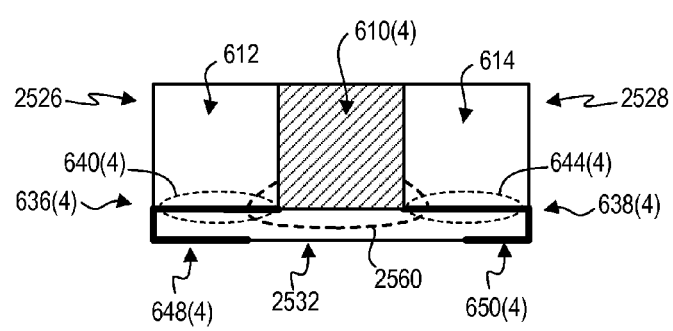
FIG. 31 shows an end of the FIG. 25 inductor.

Coupled inductor 2500 has a width 2502, a depth 2504, and a height 2506. FIG. 26 shows a perspective view of inductor 2500 with first rail 612 removed. FIG. 27 shows a first side 2526 of inductor 2500, and FIG. 28 shows a close-up view of portion 2701 of FIG. 27. FIG. 29 shows a second side 2528 of inductor 2500, and FIG. 30 shows a close-up view of portion 2901 of FIG. 29. FIG. 31 shows an end 2530 of inductor 2500.

Common leakage plate 2532 is formed of magnetic material. Each winding first end 636 and each winding second end 638 is wrapped at least partially around leakage plate 2532. Common leakage plate 2532 is disposed on the bottom of magnetic core 608, such that leakage plate 2532 is disposed along both of outer surface 618 of first rail 612 and outer surface 622 of second rail 614. Winding first portions 640 are disposed on first rail outer surface 618, and common leakage plate 2532 is disposed on first portions 640 (see FIGS. 28 and 31). Winding second portions 644 are disposed on second rail outer surface 622, and common leakage plate 2532 is disposed on second portions 644 (see FIGS. 30 and 31). Thus, first portion 640 of each winding 610 is disposed between outer surface 618 of first rail 612 and an outer surface 2542 of common leakage plate 2532, and second portion 644 of each winding 610 is disposed between outer surface 622 of second rail 614 and outer surface 2542 of common leakage plate 2532. Accordingly, first and second rails 612, 614 and common leakage plate 2532 shield winding portions 640, 644 from other electrical circuitry. Common leakage plate 2532 is typically also separated from rails 612, 614 by other non-magnetic material, such as air, plastic, paper, and/or adhesive. However, in certain embodiments, some magnetic material is present between common leakage plate 2532 and rails 612, 614, such as to regulate spacing between the leakage plates and the rails. Additionally, in some embodiments, winding portions 640, 644 are separated from some or all rail and leakage plate outer surfaces 618, 622, 2542 by insulating material.

Common leakage plate 2532 forms part of numerous leakage magnetic flux paths for windings 610. For example, FIG. 27 illustrates a first leakage magnetic flux path 2552 for winding 610(4) partially formed by common leakage plate 2532 and first rail 612, and FIG. 29 illustrates a second leakage magnetic flux path 2554 for winding 610(4) partially formed by common leakage plate 2532 and second rail 614. Additionally, common leakage plate 2532 forms parts of leakage magnetic flux paths between first and second rails 612, 614. For example, FIG. 31 illustrates a third leakage magnetic flux path 2560 for winding 610(4) between first and second rails 612, 614. Thus, leakage magnetic flux paths interact in common leakage plate 2532, which may make it relatively difficult to individually control leakage inductance values for each winding 610. However, the fact that common leakage plate 2532 provides a path for magnetic flux between first and second fails 612, 614 promotes large leakage inductance values. Thus, coupled inductor 2500 will have larger leakage inductance values than coupled inductor 1800, assuming otherwise identical inductor construction and otherwise identical operating conditions. Leakage inductance values of windings 610 can be adjusted, for example, by varying linear separation distances 2556, 2558 between common leakage plate 2532 and rails 612, 614. Accordingly, separation distances 2556, 2558 of inductor 2500 will typically be larger than separation distances 1856, 1858 of inductor 1800 to achieve the same leakage inductance values, assuming otherwise identical inductor construction and operating conditions. Larger separation distances, in turn, reduce magnetic flux density, thereby promoting low core losses and high saturation current rating.

Common leakage plate 2532 is shown as having a rectangular shape and extending along the entirety of inductor width 2502. However, the shape of common leakage plate 2532 could be varied without departing from the scope hereof. For example, in some alternate embodiments, common leakage plate 2532 has rounded corners. Additionally, in some alternate embodiments, common leakage plate 2532 does not extend along entire inductor width 2502. Furthermore, although linear separation distances 2556, 2558 are shown as being constant along inductor width 2502, in certain alternate embodiments, one or more of separation distances 2556, 2558 varies along width 2502 to achieve asymmetrical leakage inductance values.

Figure 32:
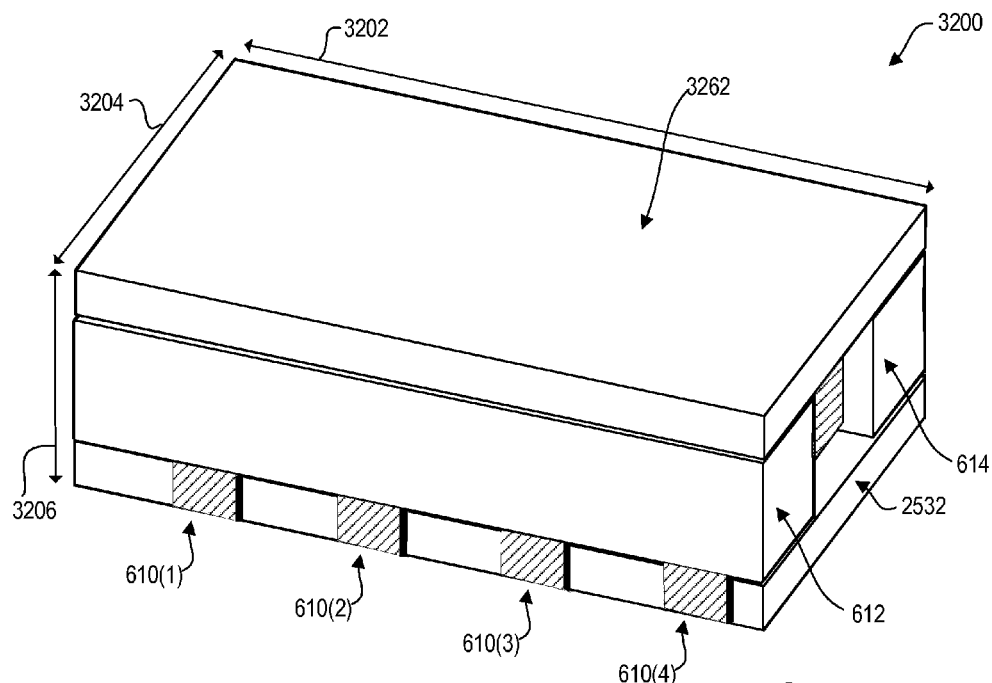
FIG. 32 shows a perspective view of a coupled inductor which is similar to the inductor of FIG. 25, but with a top magnetic element disposed over the magnetic core, according to an embodiment.
Figure 33:
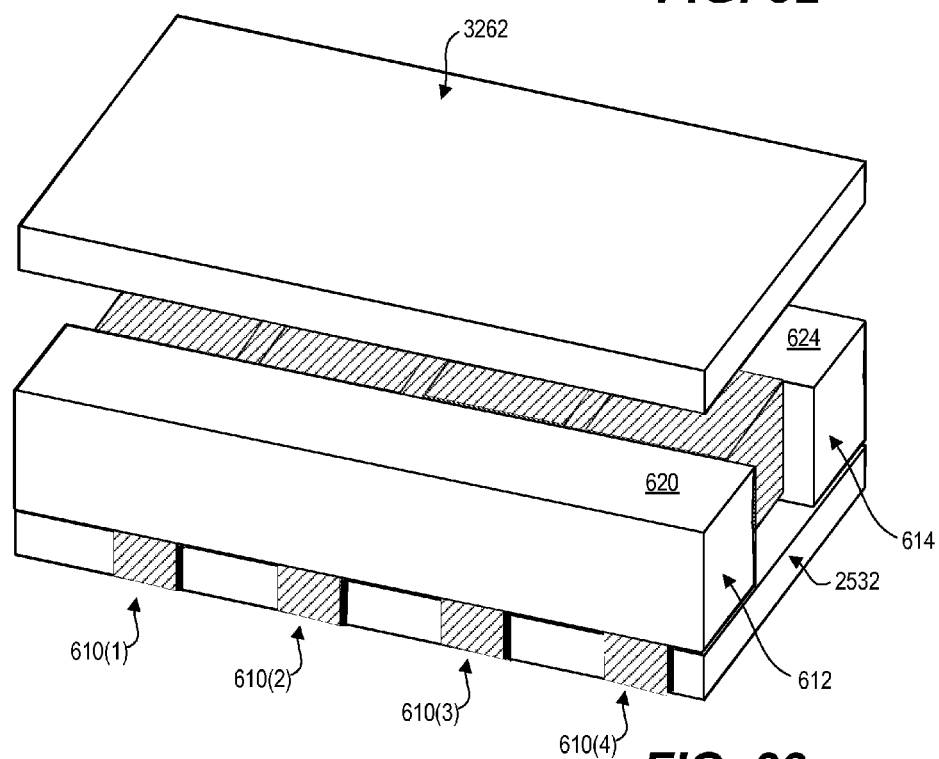
FIG. 33 shows an exploded perspective view of the FIG. 32 coupled inductor.

Some embodiments of coupled inductors 600, 1800, and 2500 further include an additional or "top" magnetic element separate from the leakage plate(s) and disposed over ladder magnetic core 608 to provide an additional path for leakage magnetic flux, thereby promoting large leakage inductance values. In particular, the top magnetic element is disposed over and faces outer surfaces 620, 624 of first and second rails 612, 614, thereby providing a path for magnetic flux between first and second rails 612, 614. For example, FIG. 32 shows a perspective view of a coupled inductor 3200, which is similar to coupled inductor 2500 (FIG. 25), but includes a top magnetic element 3262 disposed over magnetic core 608. FIG. 33 shows an exploded perspective view of inductor 3200 with top magnetic element 3262 separated from the reminder of inductor 3200. Coupled inductor 3200 has a width 3202, a depth 3204, and a height 3206.

Top magnetic element 3262 is disposed over and faces second outer surfaces 620, 624 of first and second rails 612, 614, respectively, to provide a magnetic flux path between first and second rails 612, 614. Thus, addition of top magnetic element 3262 will result in lower magnetic flux density for a given leakage inductance value relative to coupled inductor 2500 (FIG. 25), thereby promoting low cores losses and high saturation current rating. Top magnetic element 3262 also helps shield other electrical circuitry from windings 610, thereby promoting electromagnetic compatibility between inductor 3200 and other circuitry. Similar advantages may be realized by adding a top magnetic element to inductor 600 or inductor 1800.

Top magnetic element 3262 is shown as spanning the entire width 3202 and depth 3204 of inductor 3200, thereby extending over each rung 616, to maximize leakage inductance. However, in some alternate embodiments where smaller leakage inductance is desired, top magnetic element 3262 spans only part of width 3202 and/or depth 3204 to reduce the effective cross-section of the magnetic flux path between rails 612, 614.

Figure 34:
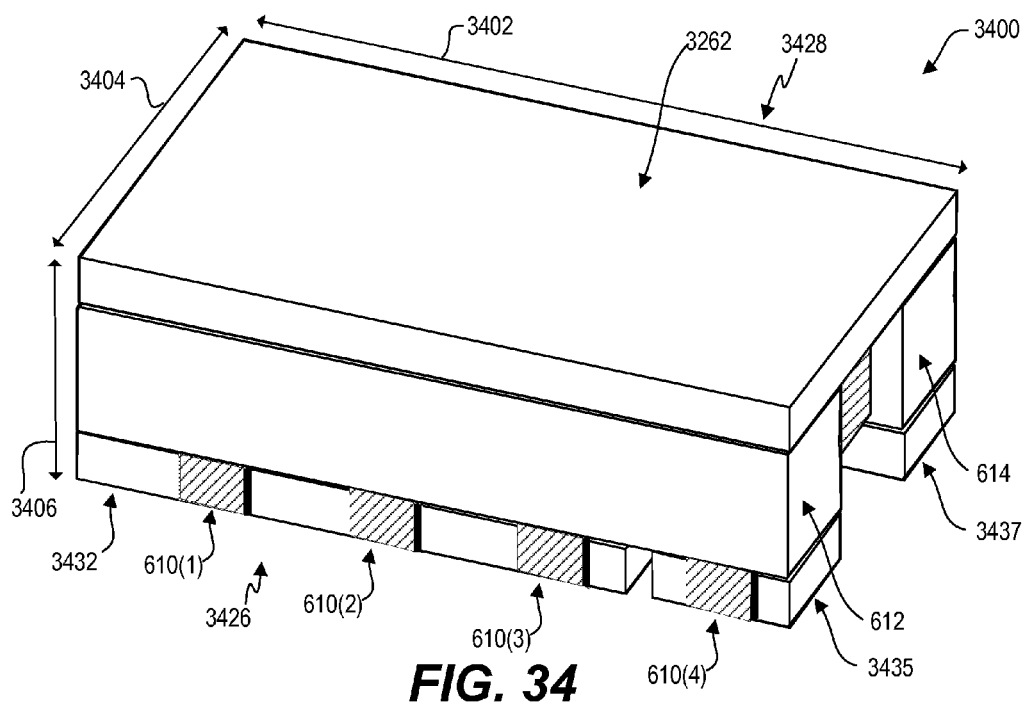
FIG. 34 shows a perspective view of a coupled inductor which is similar to the inductor of FIG. 32, but with one winding wrapped around dedicated leakage plates, according to an embodiment

In some alternate embodiments of coupled inductors 1800, 2500, and 3200, one or more windings 610 are wrapped around dedicated leakage plates, instead of around a common leakage plate, to obtain asymmetrical leakage inductance values. For example, FIG. 34 shows a perspective view of a coupled inductor 3400, which is similar to coupled inductor 3200 (FIG. 32), but where winding 610(4) is wrapped around dedicated leakage plates 3435, 3437, instead of around a common leakage plate. Windings 610 (1)-610(3), in turn, are wrapped around a common leakage plate 3432 formed of magnetic material, in a manner similar to that of inductors 2500 and 3200. Dedicated leakage plates 3435, 3457 are separate from each other and are separate from common leakage plate 3432, so that leakage plates 3435, 3437 do not provide a substantial leakage magnetic flux path for windings 610(1)-610(3).

Figure 35:
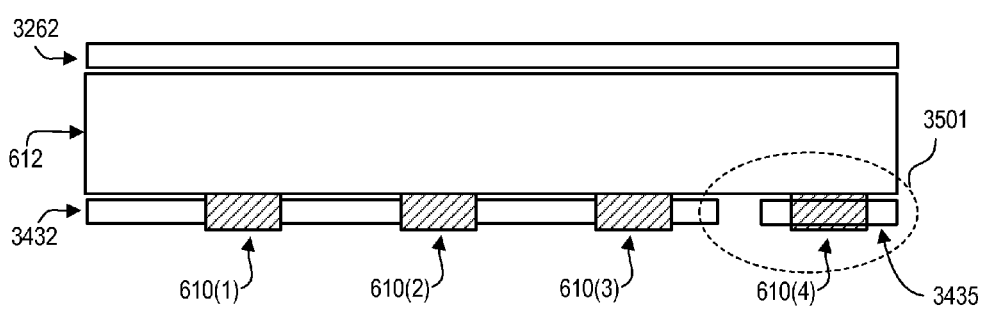
FIG. 35 shows a first side of the FIG. 34 inductor.
Figure 36:
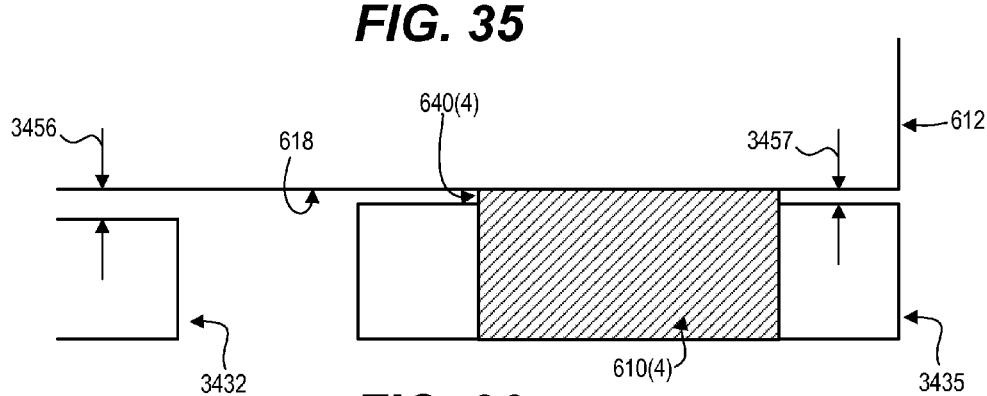
FIG. 36 shows a close-up view of a portion of FIG. 35.
Figure 37:
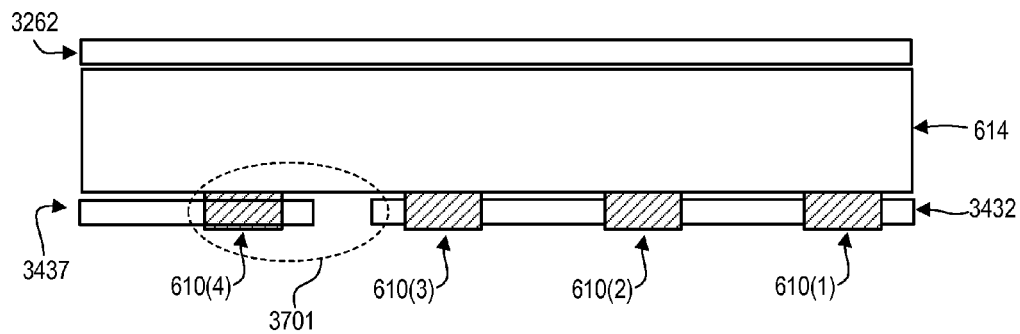
FIG. 37 shows a second side of the FIG. 34 inductor.
Figure 38:
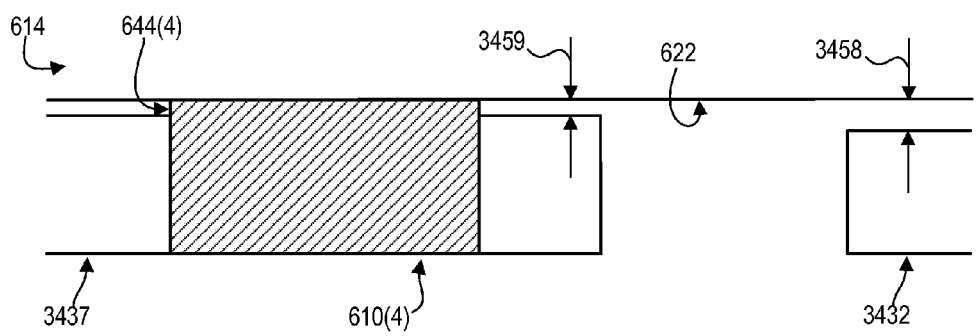
FIG. 38 shows a close-up view of a portion of FIG. 37.

Coupled inductor 3400 has a width 3402, a depth 3404, and a height 3406. FIG. 35 shows a first side 3426 of inductor 3400, and FIG. 36 shows a close-up view of portion 3501 of FIG. 35. FIG. 37 shows a second side 3428 of inductor 3400, and FIG. 38 shows a close-up view of portion 3701 of FIG. 37.

Dedicated leakage plates 3435, 3437 are formed of magnetic material and are configured and arranged similarly to leakage plates 632(4), 634(4) of inductor 600 (FIG. 6). For example, first portion 640(4) of winding 610(4) is disposed on first rail outer surface 618, and first dedicated leakage plate 3435 is disposed on winding first portion 640(4). Similarly, second portion 644(4) of winding 610(4) is disposed on second rail outer surface 622, and second dedicated leakage plate 3437 is disposed on winding second portion 644(4). Insulating material optionally separates winding portions 640(4), 644(4) from some or all of rail outer surfaces 618, 622 and dedicated leakage plates 3435, 3437.

Common leakage plate 3432 is configured and arranged similarly to common leakage plate 2532 of inductors 2500 and 3200. First portions 640 of windings 610(1)-610(3) are disposed on first rail outer surface 618, and common leakage plate 3432 is disposed on first portions 640 of windings 610(1)-610(3). Similarly, second portions 644 of winding 610(1)-610(3) are disposed on second rail outer surface 622, and common leakage plate 3432 is disposed on second portions 644 of windings 610(1)-610(3). Insulating material optionally separates portions 640, 644 of windings 610(1)- 610(3) from some or all of rail outer surfaces 618, 622 and common leakage plate 3432.

Common leakage plate 3432 is separated from first rail 612 by a linear separation distance 3456, and dedicated leakage plate 3435 is separated from first rail 612 by a linear separation distance 3457 (see FIG. 36). Common leakage plate 3432 is separated from second rail 614 by a linear separation distance 3458, and dedicated leakage plate 3437 is separated from second rail 614 by a linear separation distance 3459 (see FIG. 38). The leakage inductance values of windings 610(1)-610(3) are a function of separation distances 3456, 3458, and the leakage inductance value of winding 610(4) is a function of separation distances 3457, 3459. Accordingly, the leakage inductance value of winding 610(4) can be adjusted separately from the leakage inductance values of windings 610(1)-610(3), thereby enabling winding 610(4) to have a different leakage inductance value than windings 610(1)-610(3). It is anticipated that in many embodiments, separation distances 3457, 3459 will be smaller than separation distances 3456, 3458, respectively, so that the leakage inductance value of winding 610(4) is greater than those of windings 610(1)-610(3).

Coupled inductor 3400 could be modified so that additional windings 610 are wrapped around dedicated leakage plates, instead of around common leakage plate 3432. Additionally, coupled inductors 1800 and 2500 could be modified in a manner similar to that shown in FIG. 34 to obtain asymmetrical leakage inductance values in these inductors.

Figure 39:
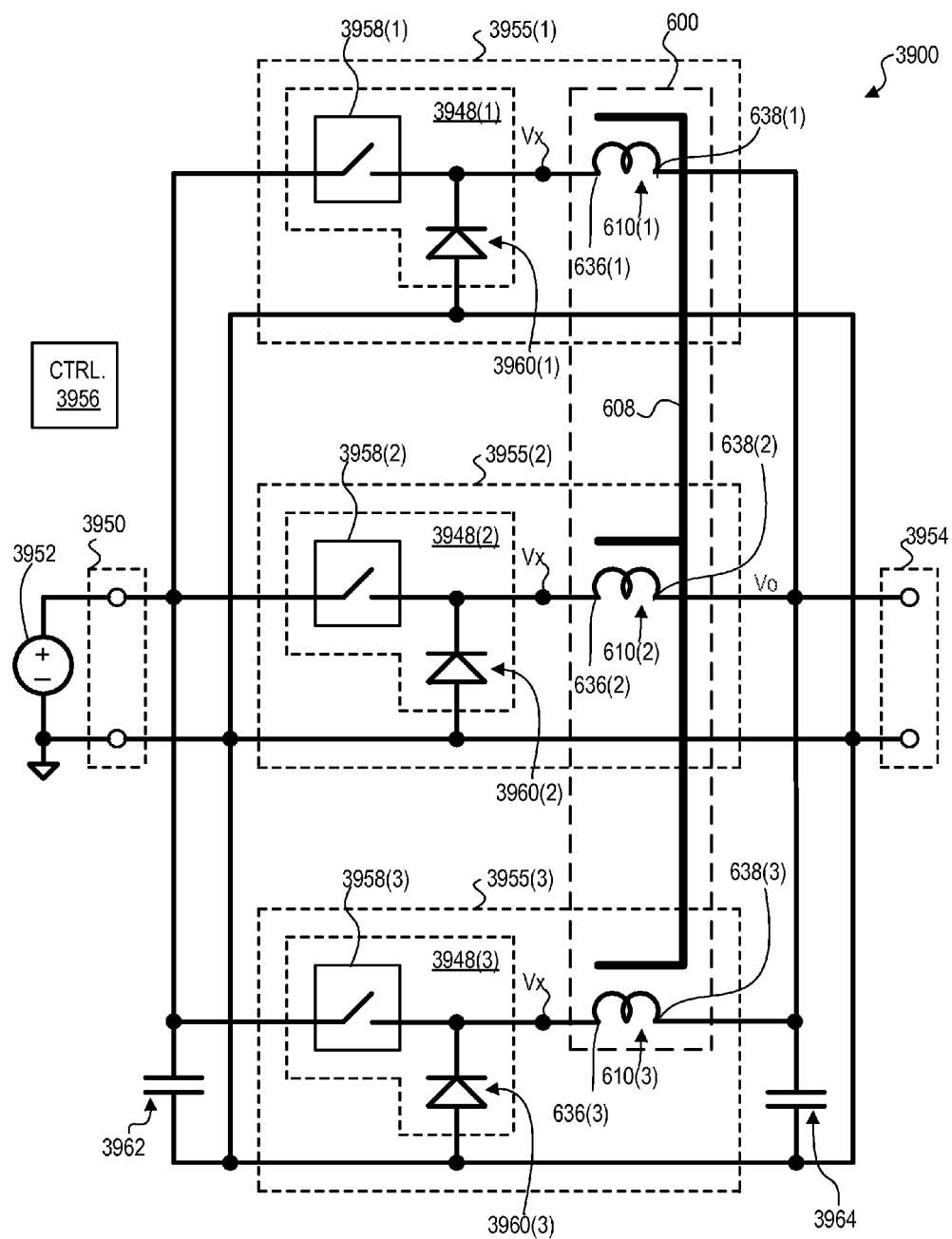
FIG. 39 shows a multi-phase buck converter, according to an embodiment.

One possible application of the coupled inductors with leakage plates disclosed herein is in switching power converter applications, including but not limited to multi-phase buck converter applications, multi-phase boost converter applications, or multi-phase buck-boost converter applications. For example, FIG. 39 shows one possible use of a three-winding or three-phase embodiment of coupled inductor 600 (FIG. 6) in a multi-phase buck converter 3900. Each winding first end 636 is electrically coupled to a respective switching node Vx, and each winding second end 638 is electrically coupled to a common output node Vo. A respective switching circuit 3948 is electrically coupled to each switching node Vx. Each switching circuit 3948 is electrically coupled to an input port 3950, which is in turn electrically coupled to an electric power source 3952. An output port 3954 is electrically coupled to output node Vo. Each switching circuit 3948 and respective inductor is collectively referred to as a "phase" 3955 of the converter. Thus, multi-phase buck converter 3900 is a three-phase converter.

A controller 3956 causes each switching circuit 3948 to repeatedly switch its respective winding first end 636 between electric power source 3952 and ground, thereby switching its first end between two different voltage levels, to transfer power from electric power source 3952 to a load (not shown) electrically coupled across output port 3954. Controller 3956 typically causes switching circuit 3948 to switch at a relatively high frequency, such as at 100 kilohertz or greater, to promote low ripple current magnitude and fast transient response, as well as to ensure that switching induced noise is at a frequency above that perceivable by humans. Additionally, in certain embodiments, controller 3956 causes switching circuits 3948 to switch out-of-phase with respect to each other to improve transient response and promote ripple current cancelation in output capacitors 3964.

Each switching circuit 3948 includes a control switching device 3958 that alternately switches between its conductive and non-conductive states under the command of controller 3956. Each switching circuit 3948 further includes a freewheeling device 3960 adapted to provide a path for current through its respective winding 610 when the control switching device 3958 of the switching circuit transitions from its conductive to non-conductive state. Freewheeling devices 3960 may be diodes, as shown, to promote system simplicity. However, in certain alternate embodiments, freewheeling devices 3960 may be supplemented by or replaced with a switching device operating under the command of controller 3956 to improve converter performance. For example, diodes in freewheeling devices 3960 may be supplemented by switching devices to reduce freewheeling device 3960 forward voltage drop. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier.

Controller 3956 is optionally configured to control switching circuits 3948 to regulate one or more parameters of multi-phase buck converter 3900, such as input voltage, input current, input power, output voltage, output current, or output power. Buck converter 3900 typically includes one or more input capacitors 3962 electrically coupled across input port 3950 for providing a ripple component of switching circuit 3948 input current. Additionally, one or more output capacitors 3964 are generally electrically coupled across output port 3954 to shunt ripple current generated by switching circuits 3948.

Buck converter 3900 could be modified to have a different number of phases. For example, converter 3900 could be modified to have only two phases and use a two-winding embodiment of inductor 600 or two-winding inductor 200. Buck converter 3900 could also be modified to use one of the other coupled inductors disclosed herein, such as inductor 1800, 2500, 3200, or 3400. Additionally, buck converter 3900 could be modified to incorporate two or more instances of one or more of the coupled inductors disclosed herein. For example, one alternate embodiment of converter 3900 includes four phases 3955 and two instances of coupled inductor 200. A first instance of inductor 200 serves the first and second phases, and a second instance of inductor 200 serves the third and fourth phases. Buck converter 3900 could also be modified to have a different topology, such as that of a multi-phase boost converter or a multi-phase buck-boost converter, or an isolated topology, such as a flyback or forward converter.

Combinations of Features

Features described above as well as those claimed below may be combined in various ways without departing from the scope hereof. The following examples illustrate some possible combinations:

(A1) A coupled inductor may include a ladder magnetic core, a first common leakage plate formed of a magnetic material, and N windings, where N is an integer greater than one. The ladder magnetic core may include first and second rails and N rungs, where each of the N rungs connects the first and second rails. Each of the N windings may include a respective first portion. Each of the N windings may be wound around a respective one of the N rungs. At least two of the N windings may be wrapped at least partially around the first common leakage plate such that a first portion of the winding is disposed between an outer surface of the first rail and an outer surface of the first common leakage plate.

(A2) In the coupled inductor denoted as (A1), the outer surface of the first rail and the outer surface of the first common leakage plate may be separated by a first non-magnetic material.

(A3) In either of the coupled inductors denoted as (A1) or (A2), the first portions of the N windings may be disposed on the outer surface of the first rail, and the first common leakage plate may be disposed on the first portions of at least two of the N windings.

(A4) Any of the coupled inductors denoted as (A1) through (A3) may further include insulating material disposed between at least one of (a) the first portions of the N windings and the outer surface of the first rail, and (b) the first portions of at least two of the N windings and the first common leakage plate.

(A5) In any of the coupled inductors denoted as (A1) through (A4), each of the windings may include a respective second portion, and the second portion of at least two of the N windings may be disposed between an outer surface of the second rail and the outer surface of the first common leakage plate.

(A6) In the coupled inductor denoted as (A5), the outer surface of the second rail and the outer surface of the first common leakage plate may be separated by a second non-magnetic material.

(A7) In either of the coupled inductors denoted as (A5) or (A6), the first common leakage plate may provide a path for magnetic flux between the first and second rails.

(A8) In any of the coupled inductors denoted as (A5) through (A7), the second portions of the N windings may be disposed on the outer surface of the second rail, and the first common leakage plate may be disposed on the second portions of at least two of the N windings.

(A9) Any of the coupled inductors denoted as (A5) through (A8) may further include insulating material disposed between at least one of (a) the second portions of the N windings and the outer surface of the second rail, and (b) the second portions of at least two of the N windings and the first common leakage plate.

(A10) Any of the coupled inductors denoted as (A1) through (A4) may further include a second common leakage plate separate from the first leakage plate and formed of magnetic material. Each of the N windings may further include a respective second portion. At least two of the N windings may be wrapped at least partially around the second common leakage plate such that the second portion of the winding is disposed between an outer surface of the second rail and an outer surface of the second common leakage plate.

(A11) In the coupled inductor denoted as (A10), the outer surface of the second rail and the outer surface of the second common leakage plate may be separated by a second non-magnetic material.

(A12) In either of the coupled inductors denoted as (A10) or (A11), the second portions of the N windings may be disposed on the outer surface of the second rail, and the second common leakage plate may be disposed on the second portions of at least two of the N windings.

(A13) Any of the coupled inductors denoted as (A10) through (A12) may further include insulating material disposed between at least one of (a) the second portions of the N windings and the outer surface of the second rail, and (b) the second portions of at least two of the N windings and the second common leakage plate.

(A14) In any of the coupled inductors denoted as (A1) through (A13), N may be greater than two.

(A15) In any of the coupled inductors denoted as (A1) through (A14), at least two of the N windings may have a first end forming a solder tab on the first leakage common plate.

(A16) Any of the coupled inductors denoted as (A1) through (A15) may further include a top magnetic element separate from the first common leakage plate and disposed over the magnetic core to provide a path for magnetic flux between the first and second rails.

(A17) Any of the coupled inductors denoted as (A1) through (A16) may further include first and second dedicated leakage plates formed of magnetic material, where the first and second dedicated leakage plates are separate from each other and are separate from the first common leakage plate.

(A18) In the coupled inductor denoted as (A17), a first one of the N windings may be wrapped at least partially around the first and second dedicated leakage plates such that (a) the first portion of the winding is disposed between the outer surface of the first rail and an outer surface of the first dedicated leakage plate, and (b) a second portion of the winding is disposed between an outer surface of the second rail and an outer surface of the second dedicated leakage plate.

(A19) In the coupled inductor denoted as (A18), the first one of the N windings may be wrapped at least partially around the first and second dedicated leakage plates such that (a) the first portion of the winding is disposed on the outer surface of the first rail, and the first dedicated leakage plate is disposed on the first portion of the winding, and (b) the second portion of the winding is disposed on the outer surface of the second rail, and the second dedicated leakage plate is disposed on the second portion of the winding.

(A20) The coupled inductor denoted as (A19) may further include insulating material disposed between at least one of (a) the first portion of the first one of N windings and the outer surface of the first rail, (b) the second portion of the first one of N windings and the outer surface of the second rail, (c) the first portion of the first one of N windings and the first dedicated leakage plate, and (d) the second portion of the first one of N windings and the second dedicated leakage plate.

(B1) A coupled inductor may include a ladder magnetic core, N first leakage plates separate from each other and formed of a magnetic material, and N windings, where N is an integer greater than one. The ladder magnetic core may include first and second rails and N rungs, and each of the N rungs may connect the first and second rails. Each of the N windings may be wound around a respective one of the N rungs. Each of the N windings may be wrapped at least partially around a respective one of the N first leakage plates such that a first portion of the winding is disposed between an outer surface of the first rail and an outer surface of the first leakage plate.

(B2) In the coupled inductor denoted as (B1), each of the N first leakage plates may be separated from the first rail by non-magnetic material.

(B3) In either of the coupled inductors denoted as (B1) or (B2), each of the N windings may be wrapped at least partially around its respective one of the N first leakage plates such that the first portion of the winding is disposed on the outer surface of the first rail, and the first leakage plate is disposed on the first portion of the winding.

(B4) Any of the coupled inductors denoted as (B1) through (B3) may further include first insulating material, and each of the N windings may be wrapped at least partially around its respective one of the N first leakage plates such that the first insulating material is disposed between at least one (a) the first portion of the winding and the outer surface of the first rail, and (b) the first portion of the winding and the first leakage plate.

(B5) Any of the coupled inductors denoted as (B1) through (B4) may further include N second leakage plates separate from each other and formed of magnetic material, and each of the N windings may be wrapped at least partially around a respective one of the N second leakage plates such that a second portion of the winding is disposed between an outer surface of the second first rail and an outer surface of the second leakage plate.

(B6) In the coupled inductor denoted as (B5), each of the second leakage plates may be separated from the second rail by non-magnetic material.

(B7) In either of the coupled inductors denoted as (B5) or (B6), each of the N windings may be wrapped at least partially around its respective one of the N second leakage plates such that the second portion of the winding is disposed on the outer surface of the second rail, and the second leakage plate is disposed on the second portion of the winding.

(B8) Any of the coupled inductors denoted as (B5) through (B7) may further include second insulating material, and each of the N windings may be wrapped at least partially around its respective one of the N second leakage plates such that the second insulating material is disposed between at least one (a) the second portion of the winding and the outer surface of the second rail, and (b) the second portion of the winding and the second leakage plate (B9) In any of the coupled inductors denoted as (B1) through (B8), each of the N windings may have a first end forming a first solder tab on a respective one of the N first leakage plates, and each of the N windings may have a second end forming a second solder tab on a respective one of the N second leakage plates.

(B10) In any of the coupled inductors denoted as (B1) through (B9), at least two of the N first leakage plates may have respective different sizes.

(B11) In any of the coupled inductors denoted as (B1) through (B10), each one of the N first leakage plates may be separated from the first rail by a respective first linear separation distance varying between at least two of the N first leakage plates.

(B12) In any of the coupled inductors denoted as (B1) through (B11), N may be greater than two.

(B13) Any of the coupled inductors denoted as (B1) through (B12) may further include a top magnetic element separate from the N first leakage plates and disposed over the magnetic core to provide a path for magnetic flux between the first and second rails.

(C1) A coupled inductor may include a magnetic core, first and second leakage plates separate from the magnetic core, and first and second windings wound through the magnetic core. The first and second leakage plates may be formed of magnetic material and disposed on opposing sides of the magnetic core. The first and second windings may be wound through the magnetic core. A portion of the first winding may separate the first leakage plate from the magnetic core, and a portion of the second winding may separate the second leakage plate from the magnetic core.

(C2) In the coupled inductor denoted as (C1), the first leakage plate may be separated from the magnetic core by a first non-magnetic material, and the second leakage plate may be separated from the magnetic core by a second non-magnetic material.

(C3) In either of the coupled inductors denoted as (C1) or (C2), each of the first and second leakage plates may have a rectangular shape.

(C4) In any of the coupled inductors denoted as (C1) through (C3), the magnetic core may have a rectangular shape.

(C5) In any of the coupled inductors denoted as (C1) through (C4), each of the first and second leakage plates may have different dimensions.

(C6) In any of the coupled inductors denoted as (C1) through (C5), the first leakage plate may be separated from the magnetic core by a first linear separation distance, and the second leakage plate may be separated from the magnetic core by a second linear separation distance that is different than the first linear separation distance.

(C7) In any of the coupled inductors denoted as (C1) through (C6), the first leakage plate may be adapted to provide a path for leakage magnetic flux generated by changing current flowing through the first winding, the second leakage plate may be adapted to provide a path for leakage magnetic flux generated by changing current flowing through the second winding.

(C8) In any of the coupled inductors denoted as (C1) through (C7), first leakage magnetic flux generated by changing current flowing through the first winding may be substantially confined to a first portion of the coupled inductor, and second leakage magnetic flux generated by changing current flowing through the second winding may be substantially confined to a second portion of the coupled inductor, where the first and second portions of the coupled inductor do not overlap.

(C9) In any of the coupled inductors denoted as (C1) through (C8), the magnetic core may have opposing first and second outer surfaces, the first leakage plate may face the first outer surface, and the second leakage plate may face the second outer surface.

(C10) In the coupled inductor denoted as (C9), the portion of the first winding may be sandwiched between the first leakage plate and the first outer surface of the magnetic core, and the portion of the second winding may be sandwiched between the second leakage plate and the second outer surface of the magnetic core.

(C11) In either of the coupled inductors denoted as (C9) or (C10), each of the first and second outer surfaces of the magnetic core may be planar surfaces.

(D1) A multi-phase switching power converter may include a coupled inductor and N switching circuits, where N is an integer greater than one. The coupled inductor may include a ladder magnetic core, a first common leakage plate formed of a magnetic material, and N windings. The ladder magnetic core may include first and second rails and N rungs, and each of the N rungs may connect the first and second rails. Each of the N windings may be wound around a respective one of the N rungs. At least two of the N windings may be wrapped at least partially around the first common leakage plate such that a first portion of the winding is disposed between an outer surface of the first rail and an outer surface of the first common leakage plate. Each switching circuit may be adapted to repeatedly switch a first end of a respective one of the N windings between at least two different voltage levels.

(D2) The multi-phase switching power converter denoted as (D1) may further include a controller adapted to control the N switching circuits such that each of the N switching circuits switches out of phase with respect to at least one other of the N switching circuits.

(D3) In either of the multi-phase switching power converters denoted as (D1) or (D2), the first portions of the N windings may be disposed on the outer surface of the first rail, and the first common leakage plate may be disposed on the first portions of at least two of the N windings.

(D4) In any of the multi-phase switching power converters denoted as (D1) through (D3), the coupled inductor may further include insulating material disposed between at least one of (a) the first portions of the N windings and the outer surface of the first rail, and (b) the first portions of at least two of the N windings and the first common leakage plate.

(D5) In any of the multi-phase switching power converters denoted as (D1) through (D4), each of the N windings may further include a respective second portion, and the second portion of at least two of the N windings may be disposed between an outer surface of the second rail and the outer surface of the first common leakage plate.

(D6) In the multi-phase switching power converter denoted as (D5), the first common leakage plate may provide a path for magnetic flux between the first and second rails.

(D7) In either of the multi-phase switching power converters denoted as (D5) or (D6), the second portions of the N windings may be disposed on the outer surface of the second rail, and the first common leakage plate may be disposed on the second portions of at least two of the N windings.

(D8) In any of the multi-phase switching power converters denoted as (D5) through (D7), the coupled inductor may further include insulating material disposed between at least one of (a) the second portions of the N windings and the outer surface of the second rail, and (b) the second portions of at least two of the N windings and the first leakage plate.

(D9) In any of the multi-phase switching power converters denoted as (D1) through (D4), the inductor may further include a second common leakage plate separate from the first common leakage plate and formed of magnetic material, each of the N windings may further include a respective second portion, and at least two of the N windings may be wrapped at least partially around the second common leakage plate such that a respective second portion of the winding is disposed between an outer surface of the second rail and an outer surface of the second common leakage plate.

(D10) In the multi-phase switching power converter denoted as (D9), the second portions of the N windings may be disposed on the outer surface of the second rail, and the second common leakage plate may be disposed on the second portions of at least two of the N windings.

(D11) In either of the multi-phase switching power converters denoted as (D9) or (D10), the coupled inductor may further include insulating material disposed between at least one of (a) the second portions of the N windings and the outer surface of the second rail, and (b) the second portions of at least two of the N windings and the second common leakage plate.

(D12) In any of the multi-phase switching power converters denoted as (D1) through (D11), N may be greater than two.

(D13) In any of the multi-phase switching power converters denoted as (D1) through (D12), the multi-phase switching power converter may include at least one of a multi-phase buck converter, a multi-phase boost converter, and a multi-phase buck-boost converter.

(D14) In any of the multi-phase switching power converters denoted as (D1) through (D13), the coupled inductor may further include first and second dedicated leakage plates formed of magnetic material, where the first and second dedicated leakage plates are separate from each other and are separate from the first common leakage plate.

(D15) In the multi-phase switching power converter denoted as (D14), a first one of the N windings may be wrapped at least partially around the first and second dedicated leakage plates such that: (a) the first portion of the winding is disposed between the outer surface of the first rail and an outer surface of the first dedicated leakage plate, and (b) a second portion of the winding is disposed between an outer surface of the second rail and an outer surface of the second dedicated leakage plate.

(D16) In the multi-phase switching power converter denoted as (D15), the first one of the N windings may be wrapped at least partially around the first and second dedicated leakage plates such that: (a) the first portion of the winding is disposed on the outer surface of the first rail, and the first dedicated leakage plate is disposed on the first portion of the winding, and (b) the second portion of the winding is disposed on the outer surface of the second rail, and the second dedicated leakage plate is disposed on the second portion of the winding.

(E1) A multi-phase switching power converter may include a coupled inductor and N switching circuits, where N is an integer greater than one. The coupled inductor may include a ladder magnetic core, N first leakage plates separate from each other and formed of a magnetic material, and N windings. The ladder magnetic core may include first and second rails and N rungs, and each of the N rungs may connect the first and second rails. Each of the N windings may be wound around a respective one of the N rungs. Each of the N windings may be wrapped at least partially around a respective one of the N first leakage plates such that a first portion of the winding is disposed between an outer surface of the first rail and an outer surface of the first leakage plate. Each switching circuit may be adapted to repeatedly switch a first end of a respective one of the N windings between at least two different voltage levels.

(E2) In the multi-phase switching power converter denoted as (E1), each of the N windings may be wrapped at least partially around its respective one of the N first leakage plates such that the first portion of the winding is disposed on the outer surface of the first rail, and the first leakage plate is disposed on the first portion of the winding.

(E3) In either of the multi-phase switching power converters denoted as (E1) or (E2), the coupled inductor may further include first insulating material, and each of the N windings may be wrapped at least partially around its respective one of the N first leakage plates such that the first insulating material is disposed between at least one (a) the first portion of the winding and the outer surface of the first rail and (b) the first portion of the winding and the first leakage plate.

(E4) In any of the multi-phase switching power converters denoted as (E1) through (E3), the coupled inductor may further include N second leakage plates separate from each other and formed of magnetic material, and each of the N windings may be wrapped at least partially around a respective one of the N second leakage plates such that a second portion of the winding is disposed between an outer surface of second rail and an outer surface of the second leakage plate.

(E5) In the multi-phase switching power converter denoted as (E4), each of the N windings may be wrapped at least partially around its respective one of the N second leakage plates such that the second portion of the winding is disposed on the outer surface of the second rail, and the second leakage plate is disposed on the second portion of the winding.

(E6) In either of the multi-phase switching power converters denoted as (E4) or (E5), the inductor may further include second insulating material, and each of the N windings may wrapped at least partially around its respective one of the N second leakage plates such that the second insulating material is disposed between at least one (a) the second portion of the winding and the outer surface of the second rail and (b) the second portion of the winding and the second leakage plate.

(E7) In any of the multi-phase switching power converters denoted as (E1) through (E6), at least two of the N first leakage plates may have respective different sizes.

(E8) In any of the multi-phase switching power converters denoted as (E1) through (E7), each one of the N first leakage plates may be separated from the first rail by a respective first linear separation distance varying between at least two of the N first leakage plates.

(E9) In any of the multi-phase switching power converters denoted as (E1) through (E8), N may be greater than two.

(F1) A multi-phase switching power converter may include a coupled inductor and first and second switching circuits. The coupled inductor may include a magnetic core, first and second leakage plates separate from the magnetic core, and first and second windings wound through the magnetic core. The first and second leakage plates may be formed of magnetic material and disposed on opposing sides of the magnetic core. A portion of the first winding may separate the first leakage plate from the magnetic core, and a portion of the second winding may separate the second leakage plate from the magnetic core. The first switching circuit may be adapted to repeatedly switch a first end of the first winding between at least two different voltage levels, and the second switching circuit may be adapted to repeatedly switch a first end of the second winding between at least two different voltage levels.

(F2) In the multi-phase switching power converter denoted as (F1), the first leakage plate may be separated from the magnetic core by a first non-magnetic material, and the second leakage plate may be separated from the magnetic core by a second non-magnetic material.

(F3) In either of the multi-phase switching power converters denoted as (F1) or (F2), first leakage magnetic flux generated by changing current flowing through the first winding may be substantially confined to a first portion of the coupled inductor, and second leakage magnetic flux generated by changing current flowing through the second winding may be substantially confined to a second portion of the coupled inductor, where the first and second portions of the coupled inductor do not overlap.

(F4) In any of the multi-phase switching power converters denoted as (F1) through (F3), the magnetic core may have opposing first and second outer surfaces, the first leakage plate may face the first outer surface, and the second leakage plate may face the second outer surface.

(F5) In the multi-phase switching power converter denoted as (F4), the portion of the first winding may be sandwiched between the first leakage plate and the first outer surface of the magnetic core, and the portion of the second winding may be sandwiched between the second leakage plate and the second outer surface of the magnetic core.

Changes may be made in the above methods and systems without departing from the scope hereof. For example, the number of turns formed by the coupled inductor windings may be varied. As another example, although coupled inductors 600, 1800, 2500, 3200, and 3400 are shown with N being equal to four, N could alternately be any other integer greater than one. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A coupled inductor, comprising:
    a ladder magnetic core including first and second rails and N rungs, each of the N rungs connecting the first and second rails, N being an integer greater than one;
    N first leakage plates separate from each other and formed of a magnetic material;
    N second leakage plates separate from each other and formed of magnetic material; and
    N windings, each of the N windings being wound around a respective one of the N rungs,
    each of the N windings being wrapped at least partially around a respective one of the N first leakage plates such that a first portion of the winding is disposed on an outer surface of the first rail and the first leakage plate is disposed on the first portion of the winding, such that the first portion of the winding is disposed between the outer surface of the first rail and the outer surface of the first leakage plate,
    each of the N windings being wrapped at least partially around a respective one of the N second leakage plates such that a second portion of the winding is disposed between an outer surface of the second rail and an outer surface of the second leakage plate.

2. The coupled inductor of claim 1, each of the N first leakage plates being separated from the first rail by non-magnetic material.

3. The coupled inductor of claim 1, further comprising first insulating material, each of the N windings being wrapped at least partially around its respective one of the N first leakage plates such that the first insulating material is disposed between at least one (a) the first portion of the winding and the outer surface of the first rail, and (b) the first portion of the winding and the first leakage plate.

4. The coupled inductor of claim 1, each of the second leakage plates being separated from the second rail by non-magnetic material.

5. The coupled inductor of claim 1, each of the N windings being wrapped at least partially around its respective one of the N second leakage plates such that the second portion of the winding is disposed on the outer surface of the second rail, and the second leakage plate is disposed on the second portion of the winding.

6. The coupled inductor of claim 5, further comprising second insulating material, each of the N windings being wrapped at least partially around its respective one of the N second leakage plates such that the second insulating material is disposed between at least one (a) the second portion of the winding and the outer surface of the second rail, and (b) the second portion of the winding and the second leakage plate.

7. The coupled inductor of claim 1, each of the N windings having a first end forming a first solder tab on a respective one of the N first leakage plates, each of the N windings having a second end forming a second solder tab on a respective one of the N second leakage plates.

8. The coupled inductor of claim 1, at least two of the N first leakage plates having respective different sizes.

9. The coupled inductor of claim 1, each one of the N first leakage plates being separated from the first rail by a respective first linear separation distance varying between at least two of the N first leakage plates.

10. The coupled inductor of claim 1, N being greater than two.

11. The coupled inductor of claim 1, further comprising a top magnetic element separate from the N first leakage plates and disposed over the magnetic core to provide a path for magnetic flux between the first and second rails.

* * * * *